United States Patent
Fujinawa et al.

(10) Patent No.: US 8,454,172 B2
(45) Date of Patent: Jun. 4, 2013

(54) PROJECTOR DEVICE

(75) Inventors: Nobuhiro Fujinawa, Yokohama (JP); Setsu Mitsuhashi, Tokyo (JP); Hirotake Nozaki, Port Washington, NY (US); Akira Ohmura, Tokyo (JP)

(73) Assignee: Nikon Corporation, Tokyo (JP)

( * ) Notice: Subject to any disclaimer, the term of this patent is extended or adjusted under 35 U.S.C. 154(b) by 808 days.

(21) Appl. No.: 11/660,215

(22) PCT Filed: Nov. 25, 2005

(86) PCT No.: PCT/JP2005/021661
§ 371 (c)(1),
(2), (4) Date: Nov. 13, 2007

(87) PCT Pub. No.: WO2006/057328
PCT Pub. Date: Jun. 1, 2006

(65) Prior Publication Data
US 2008/0094579 A1 Apr. 24, 2008

(30) Foreign Application Priority Data

Nov. 26, 2004 (JP) ................................. 2004-341522
Nov. 26, 2004 (JP) ................................. 2004-341523

(51) Int. Cl.
*G03B 21/20* (2006.01)

(52) U.S. Cl.
USPC ............................................ 353/85; 362/282

(58) Field of Classification Search
USPC ..................... 353/57, 85; 362/282, 257, 293
See application file for complete search history.

(56) References Cited

U.S. PATENT DOCUMENTS

| | | | | |
|---|---|---|---|---|
| 5,702,169 A | * | 12/1997 | Nishimura | 353/25 |
| 6,969,960 B2 | * | 11/2005 | Belliveau | 315/312 |
| 6,992,811 B2 | * | 1/2006 | Williams et al. | 359/291 |
| 7,283,181 B2 | * | 10/2007 | Allen et al. | 348/744 |
| 7,391,475 B2 | * | 6/2008 | Pate et al. | 348/602 |
| 2003/0020884 A1 | * | 1/2003 | Okada et al. | 353/57 |
| 2004/0165094 A1 | * | 8/2004 | Fukui | 348/333.12 |
| 2005/0024592 A1 | * | 2/2005 | Eguchi | 353/30 |
| 2005/0128441 A1 | * | 6/2005 | Morgan | 353/102 |
| 2006/0109430 A1 | * | 5/2006 | Allen et al. | 353/101 |
| 2007/0297175 A1 | * | 12/2007 | Glent-Madsen | 362/282 |

FOREIGN PATENT DOCUMENTS

| | | |
|---|---|---|
| JP | A-48-007740 | 1/1973 |
| JP | 58-135168 U | 9/1983 |
| JP | A-03-261284 | 11/1991 |
| JP | A-04-319930 | 11/1992 |
| JP | A-09-152575 | 6/1997 |
| JP | A-10-062865 | 3/1998 |
| JP | A-10-074049 | 3/1998 |
| JP | A-10-222131 | 8/1998 |

(Continued)

OTHER PUBLICATIONS

Extended European Search Report issued in European Application No. 05809488 on Oct. 2, 2009.

*Primary Examiner* — Francis M Legasse, Jr.
*Assistant Examiner* — Jerry Brooks
(74) *Attorney, Agent, or Firm* — Miles & Stockbridge P.C.

(57) ABSTRACT

A projector device includes: an image generation unit that generates an image; an irradiation unit that irradiates light for projecting the image generated by the image generation unit upon a projection surface; and a change unit that changes luminance of the light irradiated from the irradiation unit.

9 Claims, 15 Drawing Sheets

FOREIGN PATENT DOCUMENTS

| | | |
|---|---|---|
| JP | A-2000-194070 | 7/2000 |
| JP | A-2000-236375 | 8/2000 |
| JP | A-2001-021992 | 1/2001 |
| JP | A-2001-024926 | 1/2001 |
| JP | A-2001-204044 | 7/2001 |
| JP | A-2002-015057 | 1/2002 |
| JP | A-2002-258406 | 9/2002 |
| JP | A-2003-043585 | 2/2003 |
| JP | A-2004-032207 | 1/2004 |
| JP | A 2004-61779 | 2/2004 |
| JP | A-2004-163686 | 6/2004 |
| JP | A-2004-222175 | 8/2004 |
| JP | A-2004-226631 | 8/2004 |
| JP | A-2004-228731 | 8/2004 |
| JP | A-2004-302254 | 10/2004 |
| JP | A-2004-325629 | 11/2004 |
| WO | WO 2004/059608 A1 | 7/2004 |

* cited by examiner

FIG. 3
(a)
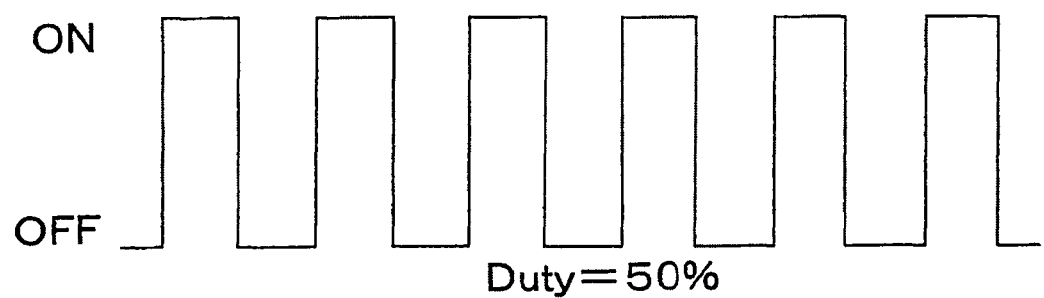
Duty=50%
(b)
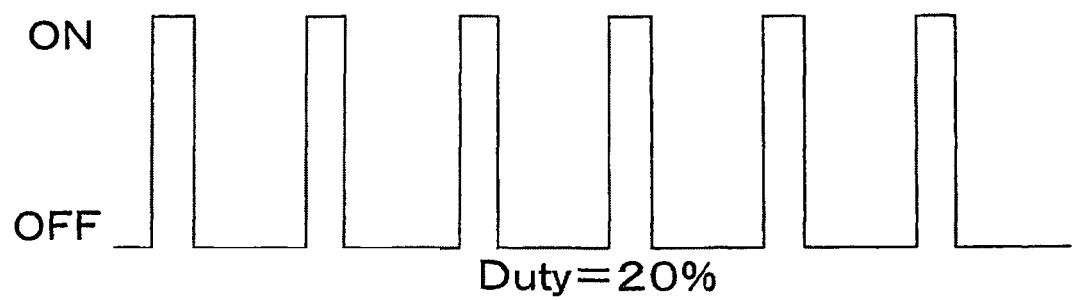
Duty=20%

FIG. 4
(a)
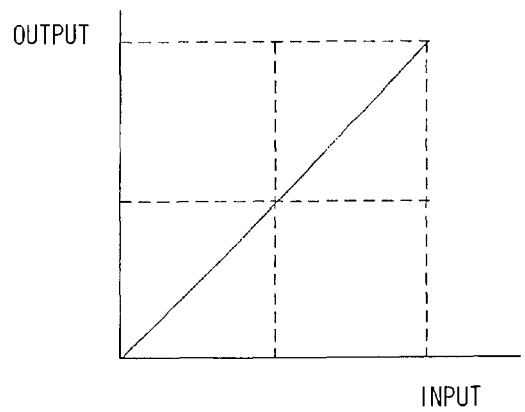
(b)
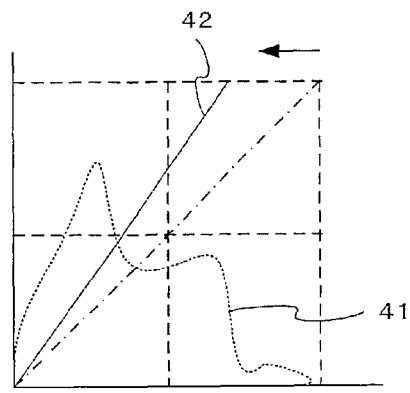
(c)
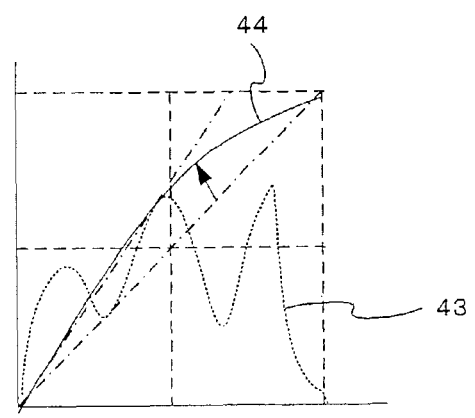

FIG. 6
(a)
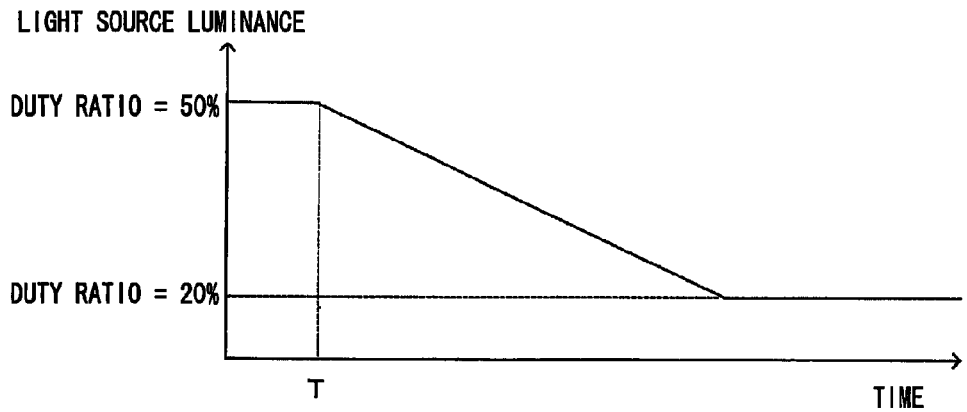
(b)
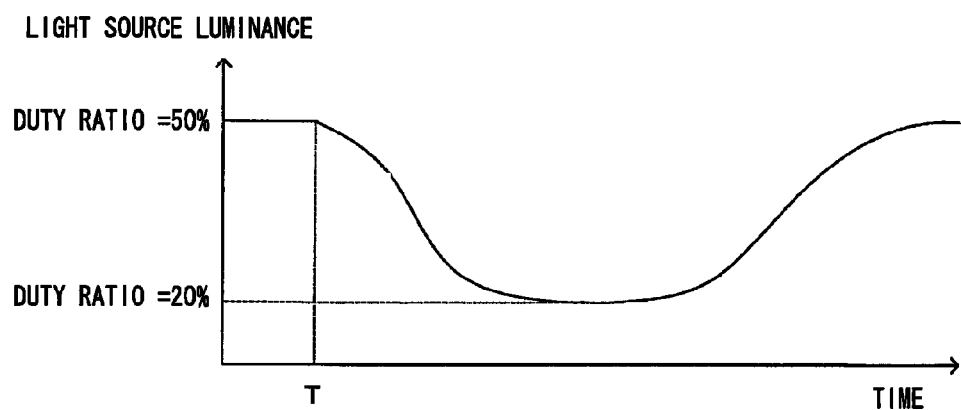
(c)
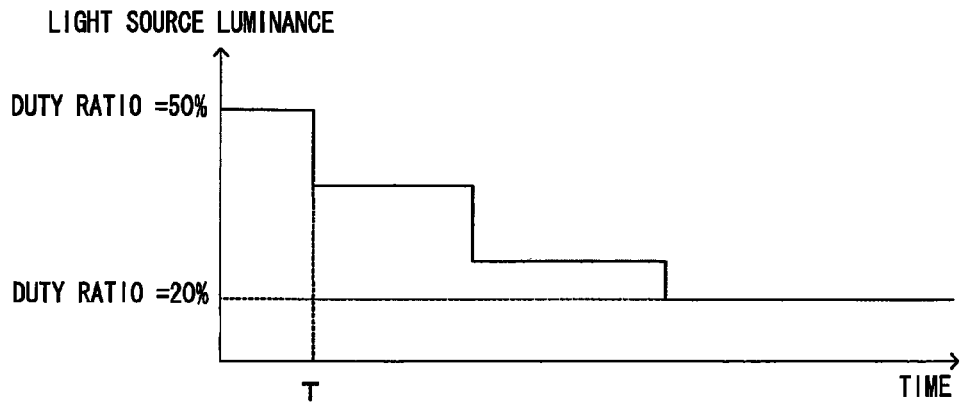

FIG. 8
(a)
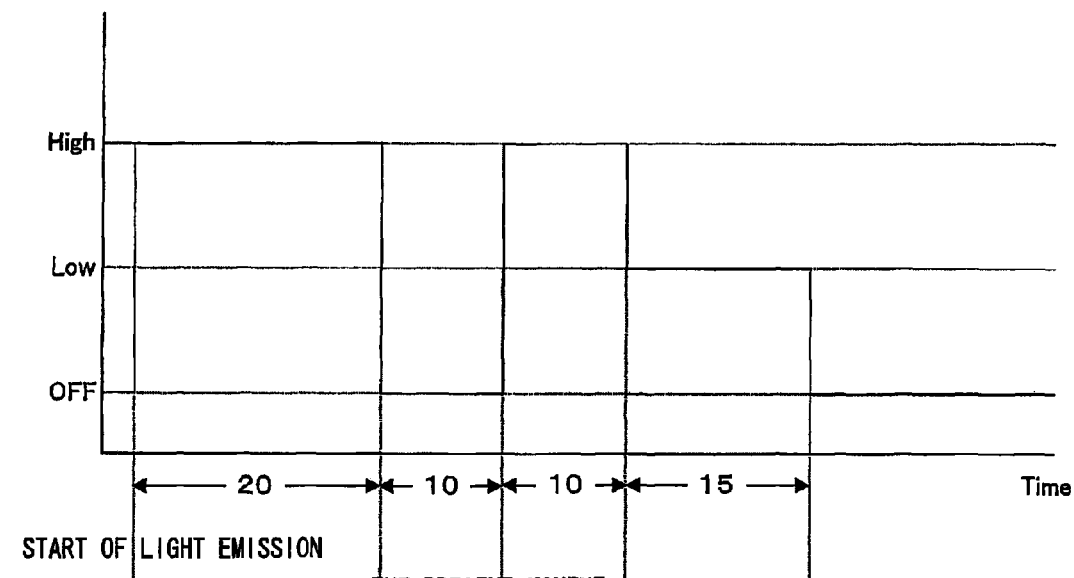
(b)
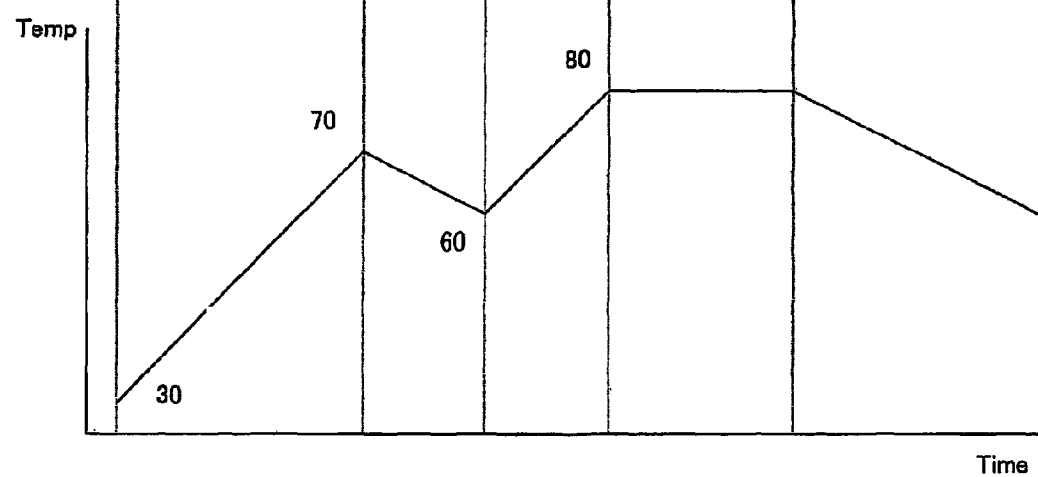

FIG. 10
(a)
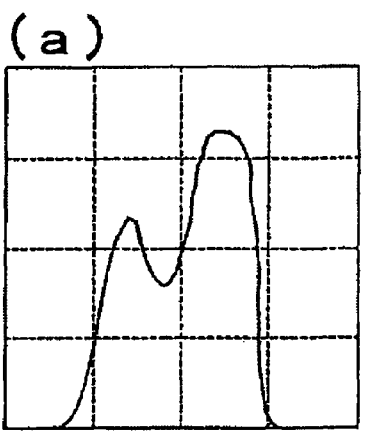
(c)
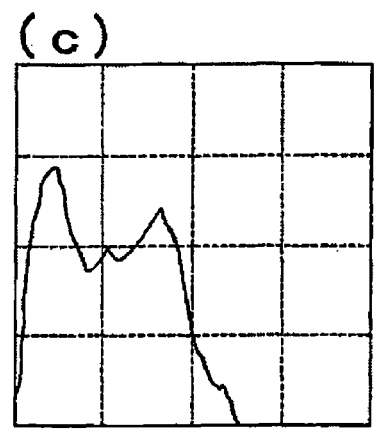
(b)
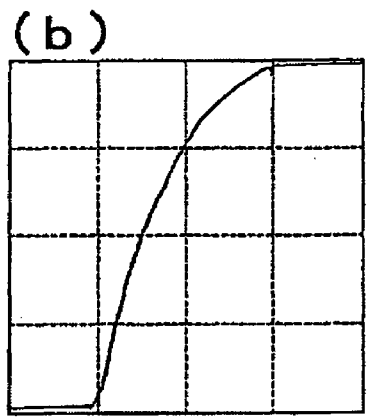
(d)
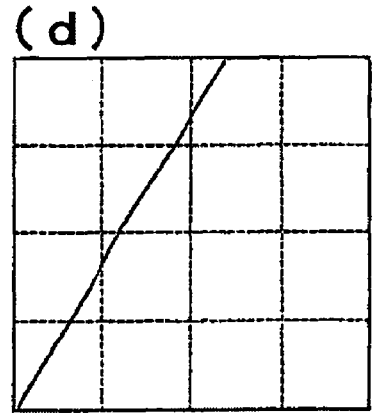

PROJECTOR DEVICE

TECHNICAL FIELD

The present invention relates to a projector device that is mounted to a portable terminal such as a portable telephone or the like, and that projects an image upon a projection surface, thus creating a projected image thereof.

BACKGROUND ART

A portable telephone device with incorporated projector, in which a projector device is mounted to a portable telephone, is known from Patent Reference #1. Furthermore, an image processing device that performs fade in processing and fade out processing upon pictures, thus providing a good visual sensation during image replay, is known from Patent Reference #2.

Patent Reference #1: Japanese Laid-Open Patent, Publication 2000-236375;
Patent Reference #2: Japanese Laid-Open Patent Publication 2001-204044.

DISCLOSURE OF THE INVENTION

Problems to be Solved by the Invention

However, with a prior art portable telephone device with incorporated projector, it is necessary to supply a large electrical current to the light source in order to obtain a bright projection image, and the problem has arisen that thermal countermeasures have not been implemented, irrespective of the fact that the amount of heat generation increases along with increase of the supplied electrical current. Furthermore, with prior art devices, the problem has arisen that a large load has been imposed upon the CPU, in order to perform image processing for fade in and fade out.

Means for Solving the Problems

According to the 1st aspect of the present invention, a projector device, comprises: an image generation unit that generates an image; an irradiation unit that irradiates light for projecting the image generated by the image generation unit upon a projection surface; and a change unit that changes luminance of the light irradiated from the irradiation unit.

According to the 2nd aspect of the present invention, in the projector device according to the 1st aspect, it is preferred that: there is further provided a temperature information determination unit that determines temperature information in a neighborhood of the irradiation unit; and the change unit changes the luminance of the light irradiated from the irradiation unit, based upon the temperature information determined by the temperature information determination unit.

According to the 3rd aspect of the present invention, in the projector device according to the 2nd aspect, it is preferred that based upon temperature information determined by the temperature information determination unit, the change unit changes the luminance of the light irradiated from the irradiation unit, so as to keep the temperature in the neighborhood of the irradiation unit less than or equal to a predetermined value.

According to the 4th aspect of the present invention, in the projector device according to the 2nd or the 3rd aspect, it is preferred that the temperature information determination unit comprises: a history storage unit that stores a history of light irradiation from the irradiation unit; an estimating unit that estimates the temperature in the neighborhood of the irradiation unit, based upon the history stored in the history storage unit; and a comparison unit that decides upon the temperature information by comparing the temperature estimated by the estimating unit with the predetermined value.

According to the 5th aspect of the present invention, in the projector device according to any one of the 1st through 4th aspects, it is preferred that: there is further provided a monitor that displays the image; and the image is displayed upon the monitor, when the luminance of the light irradiated from the irradiation unit has been changed by the change unit.

According to the 6th aspect of the present invention, in the projector device according to any one of the 1st through 5th aspects, it is preferred that there is further provided a warning unit that outputs a warning to the user, when the luminance of the light irradiated from the irradiation unit has been changed by the change unit.

According to the 7th aspect of the present invention, in the projector device according to any one of the 2nd through 6th aspects, it is preferred that there is further provided a correction unit that corrects luminance of the image generated by the image generation unit, based upon the temperature information determined by the temperature information determination unit.

According to the 8th aspect of the present invention, in the projector device according to the 7th aspect, it is preferred that: there is further provided a control unit that performs control by combining change by the change unit of the luminance of the light irradiated from the irradiation unit, and correction by the correction unit of the luminance of the image generated by the image generation unit; and the control unit changes a control method based upon a type of the image.

According to the 9th aspect of the present invention, in the projector device according to the 8th aspect, it is preferred that the type of the image is any one of a still image, a moving image, a received TV broadcast image, or a character image.

According to the 10th aspect of the present invention, in the projector device according to any one of the 2nd through 6th aspects, it is preferred that the change unit varies a method of changing the luminance of the irradiated light, according to a type of the image.

According to the 11th aspect of the present invention, in the projector device according to the 10th aspect, it is preferred that: if the type of the image is still image or character image, and if the temperature information determination unit decides, based upon the temperature information, that the temperature in the neighborhood of the irradiation unit is greater than or equal to the predetermined value, then the change unit changes the luminance of the light irradiated from the irradiation unit so as to make it smaller; if the type of the image is moving image, irrespective of the decision result by the temperature information determination unit, the change unit changes the luminance of the light irradiated from the irradiation unit so as to make it smaller. According to the 12th aspect of the present invention, in the projector device according to the 10th or the 11th aspect, it is preferred that when the change unit performs change of the luminance of the irradiated light, the image generation unit changes the luminance of the image in a direction opposite to the change of luminance of the irradiated light.

According to the 13th aspect of the present invention, in the projector device according to the 12th aspect, it is preferred that when the change unit changes the irradiated light to lower, the image generation unit changes the luminance of the image to make it brighter by a linear coefficient to correct decrease of the irradiated light when a number of distributed data at a bright side of the image is less than a predetermined value, and changes the luminance of the image to make it brighter by a non-linear coefficient suppressing the bright side of the image when the number of distributed data at the bright side of the image is greater than or equal to the predetermined value.

According to the 14th aspect of the present invention, in the projector device according to the 1st aspect, it is preferred that the change unit performs at least one of change processing, when starting display of the image, to make the luminance of the light irradiated from the irradiation unit darker and thereafter gradually to make it brighter, and change processing, when terminating display of the image, to change the luminance of the light irradiated from the irradiation unit so as gradually to make it darker.

According to the 15th aspect of the present invention, in the projector device according to the 14th aspect, it is preferred that: the irradiation unit comprises a light source; and the change unit controls a drive electrical power of the light source, so as to change the luminance of the light irradiated from the light source.

According to the 16th aspect of the present invention, in the projector device according to the 14th or the 15th aspect, it is preferred that the irradiation unit comprises a solid light emitting element.

According to the 17th aspect of the present invention, in the projector device according to any one of the 14th through 16th aspects, it is preferred that: the image generation unit forms a plurality of images consecutively at predetermined time intervals; and the change unit, for each of the images, performs at least one of change processing, when starting the display of that image, so as to change the luminance of the light irradiated from the irradiation unit to make it darker and thereafter so as to make it brighter gradually, and change processing, when terminating the display of that image, so as to change the luminance of the light irradiated from the irradiation unit gradually to darker.

According to the 18th aspect of the present invention, in the projector device according to any one of the 14th through 17th aspects, it is preferred that: the image generation unit starts formation of an image automatically according to an image replay command by the user; and the irradiation unit starts irradiating light automatically according to the image replay command by the user.

According to the 19th aspect of the present invention, in the projector device according to the 18th aspect, it is preferred that the command by the user for image replay is a command to start a slide show.

According to the 20th aspect of the present invention, in the projector device according to any one of the 14th through 19th aspects, it is preferred that: when the replay of an image ends, the image generation unit automatically terminates formation of the image; and when the replay of an image ends, the irradiation unit ends irradiation of light automatically.

According to the 21st aspect of the present invention, in the projector device according to any one of the 14th through 19th aspects, it is preferred that: the irradiation unit is driven by PWM drive; and the change unit changes the luminance of the light irradiated from the irradiation unit, by continuously changing a duty ratio of a signal that drives the irradiation unit.

It should be understood that the above described image generation unit could be replaced by an image generation means, the irradiation unit by an irradiation means, the change unit by a change means, the temperature information determination unit by a temperature information decision means, the history storage unit by a history storage means, the estimating unit by a estimating means, the comparison unit by a comparison means, the warning unit by a warning means, the correction unit by a correction means, and the control unit by a control means.

ADVANTAGEOUS EFFECT OF THE INVENTION

According to the present invention, it is possible to obtain various beneficial effects, since it is arranged to vary the luminance of the light that is irradiated from the irradiation unit. For example, temperature information in the neighborhood of the irradiation unit may be determined, and the luminance of the light irradiated from the irradiation unit may be changed based upon this determined temperature information. By doing this, it is possible to determine the luminance of the light irradiated from the irradiation unit while taking into account the temperature in the neighborhood of the irradiation unit, so that it is possible to perform thermal countermeasures. Furthermore, the luminance of the light irradiated during image projection may be gradually changed. By doing this, it is possible to obtain the beneficial visual sensations of fading in and fading out. In this case it is not necessary to perform image processing, so that it is also possible to reduce the load upon the CPU.

BRIEF DESCRIPTION OF THE DRAWINGS

FIG. 3 is a figure showing concrete examples of a duty ratio in a "high" mode and in a "low" mode;

FIG. 4 is a figure showing concrete examples of LUTs that are applied for LUT correction;

FIG. 6 is a figure showing, in concrete terms, changes over time of the luminance of the light irradiated by the LED light source 21;

FIG. 8 is a figure showing the light emission history of the LED light source 21 and the change of a estimated temperature in the neighborhood of the LED light source 21;

FIG. 10 is a figure showing concrete examples of LUTs according to variant embodiments;

BEST MODE FOR CARRYING OUT THE INVENTION

-Embodiment One-

Figure 1:
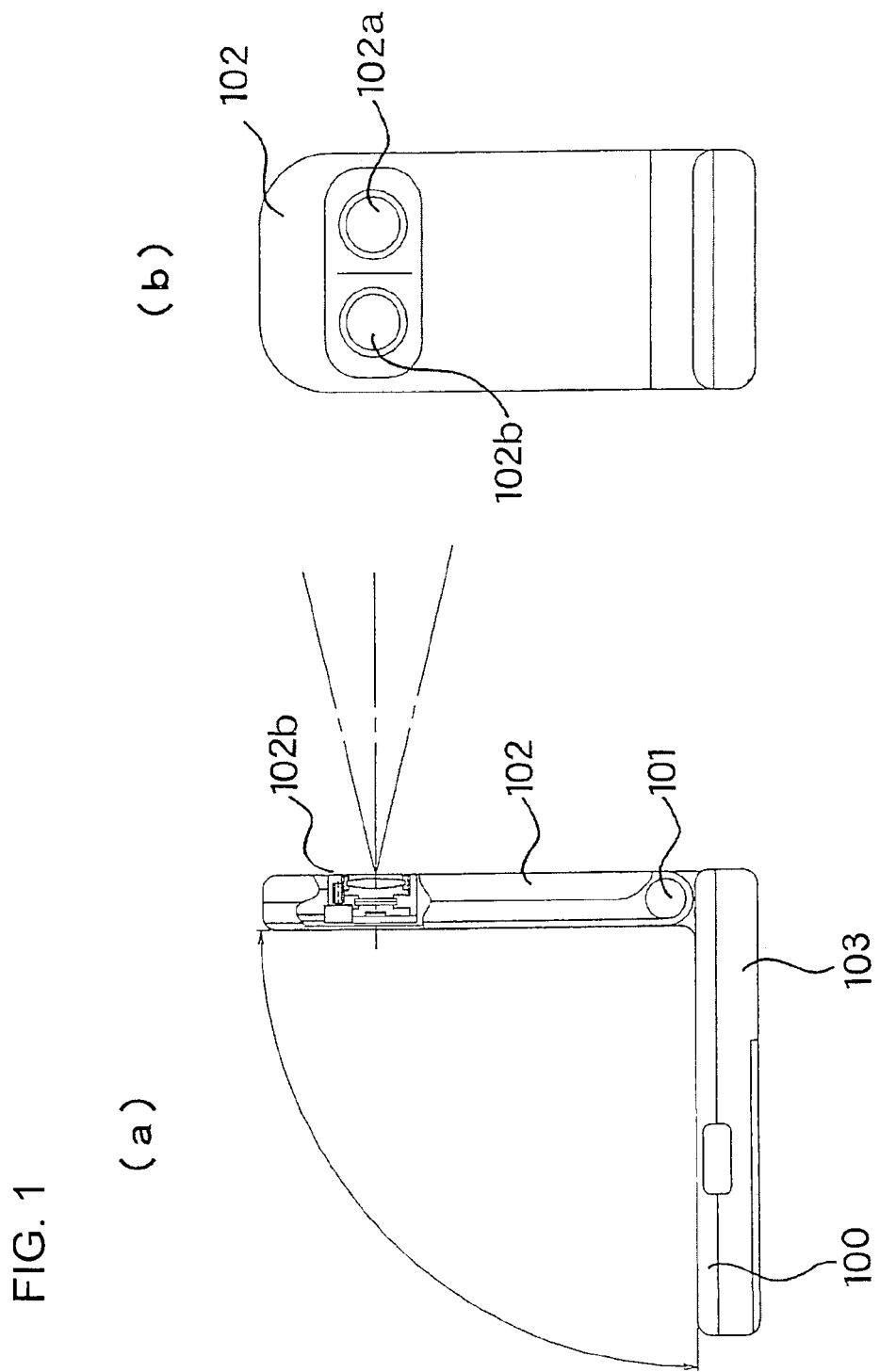
FIG. 1 is a figure showing the external appearance of a portable telephone device with incorporated projector according to a first embodiment.

FIG. 1 is a figure showing the external appearance of a portable telephone device with incorporated projector according to the first embodiment: FIG. 1(a) is a side view thereof, while FIG. 1(b) is an elevation view. As shown in FIG. 1(a), this portable telephone device 100 includes a display section 102 and an actuation unit 103, that can be folded together with a folding hinge unit 101. Moreover, as shown in FIG. 1(b), on the external surface of the display section 102, there are provided a camera unit 102a for photographing images, and a projector unit 102b that projects an image upon a projection surface, thereby generating a projection image.

Figure 2:
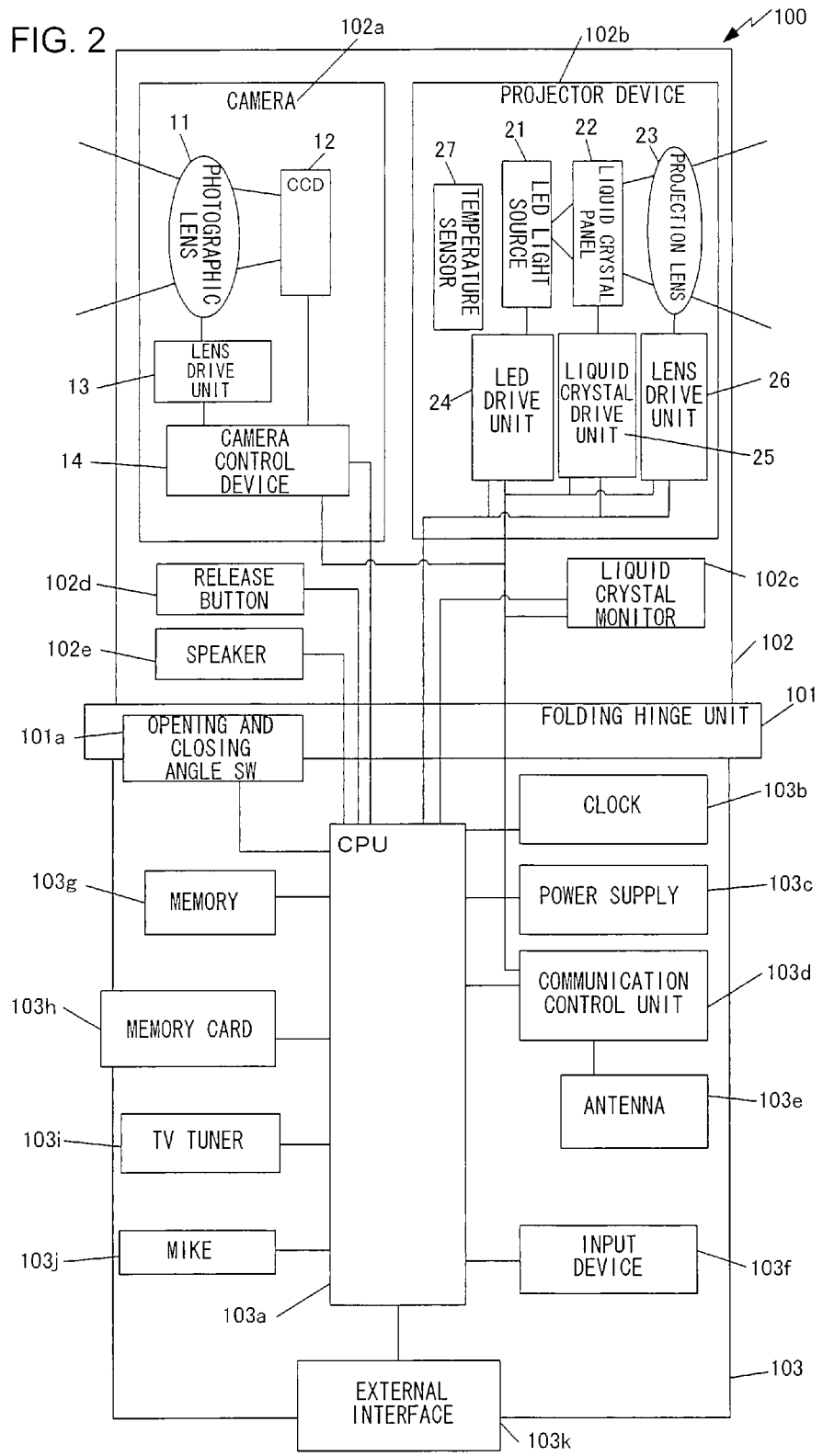
FIG. 2 is a block diagram showing the structure of this portable telephone of the first embodiment.

FIG. 2 is a block diagram showing the structure of this portable telephone of the first embodiment. This portable telephone device with incorporated projector 100, as described above, includes the folding hinge unit 101, the display section 102, and the actuation unit 103. The folding hinge unit 101 includes an opening and closing angle SW 101a that is actuated by the user to adjust the opening and closing angle between the display section 102 and the actuation unit 103.

The actuation unit 103 includes a CPU 103a that controls the device as a whole, a clock 103b that measures time, a power supply 103c for driving this portable telephone device with incorporated projector, a communication control unit 103d provided with an antenna 103e for communicating with a neighboring base station, an input device 103f provided with various types of button for the user to input telephone numbers or characters, a memory 103g for storing various types of data such as telephone directory data or the like, a memory card 103h for storing image data that has been photographed with the camera 102a, a TV tuner 103i for receiving TV broadcasts, a mike 103j for inputting voice utterances by the user, and an external interface 103k, that is an interface for connection to an external device.

The display section includes the camera 102a, the projector device 102b, a liquid crystal monitor 102c that displays an image photographed (captured) by the camera unit 102a or a wallpaper screen or the like, a release button 102d that is actuated by the user when performing image photography (image-capturing) with the camera 102a, and a speaker 102e that outputs the voice utterances of the opposite party in a telephone conversation. The camera 102a includes a photographic lens 11, a CCD 12, a lens drive unit 13, and a camera control device 14.

In the camera 102a, the photographic lens 11 is driven forward and backward by the lens drive unit 13, and is thereby capable of zooming in upon a photographic subject and zooming out therefrom. And, when the photographic lens 11 is oriented towards the photographic subject, photography is performed under conditions of exposure that are set according to the luminance of the photographic subject, and electric charges corresponding to an image of the photographic subject are accumulated upon the CCD 12, that is an image sensor (an image-capturing element). These electric charges accumulated upon the CCD 12 are converted into a digital signal by being A/D converted by a camera control device that includes a CPU and peripheral circuitry thereof. Thereafter various types of image processing are performed, such as white balance adjustment and image formatting that set in advance, for example compression formatting into the JPEG format or the like. The image data that has thus been image processed is stored in the memory 103g, and is simultaneously displayed upon the liquid crystal monitor 102c.

By executing the processing described above so as to process, for example, thirty image frames in each one second, the image made by photographing the photographic subject is successively updated, and a through image is displayed upon the liquid crystal monitor 102c. This portable telephone device with incorporated projector 100 according to the first embodiment has the capability of selecting, as modes for photographing images with the camera 102a, a moving image (movie) photographic mode and a still image photographic mode. The user is able to select either of these photographic modes by using the input device 103f that is provided to the actuation unit 103.

If the moving image photographic mode has been selected by the user, then, when the release button 102d is depressed by the user at any desired timing during the above described through image display, during the time interval until the release button is next depressed, the through image that has been photographed is temporarily stored in a memory 104 as a moving image (movie). Thereafter, after various types of image processing have been performed upon this image, it is stored in the memory card 103h that is provided to the actuation unit 103. On the other hand, if the still image photographic mode has been selected by the user, then, at the time point that the release button 102d is depressed by the user at any desired timing, the image that is being displayed upon the liquid crystal monitor 102c is photographed as a still image. This image that has been photographed is temporarily stored in the memory 104, and thereafter, after various types of image processing have been performed upon this image, it is stored in the memory card 103h that is provided to the actuation unit 103.

The projector device 102b includes a LED light source 21, a liquid crystal panel 22 that displays an image, a projection lens 23 that is capable of projecting light that has been irradiated from the LED light source 21 and that has passed through the liquid crystal panel 22 upon a screen in magnified form, a LED drive unit 24 that supplies electrical current for causing the LED light source 21 to emit light, a liquid crystal drive unit 25 that drives the liquid crystal panel 22, a lens drive unit 26 that drives the projection lens 23 for focusing the image that is being projected, and a temperature sensor 27 that measures the temperature in the neighborhood of the installation position of the LED light source 21. It should be understood that the LED drive unit 24, the liquid crystal drive unit 25, and the lens drive unit 26 are controlled by a CPU 103a that will be described hereinafter, and that is mounted to the actuation unit 103.

A high luminance type white colored LED that can be driven with a high electrical current is used in the LED light source 21. In other words, while with a normal LED the light emitting portion is of a size of around 0.3 mm×0.3 mm and is caused to emit light by a current-flow of around 20 mA, in the projector device 102b of this first embodiment, there is used a high current type LED whose light emitting portion is of a large area of around 1 mm×1 mm and that is caused to emit light by a high current flow of 200 mA~350 mA. Due to this, nearly ten times the amount of light is obtained as compared to a normal LED.

The LED drive unit 24 drives the LED light source 21 by PWM drive, and is able to vary the light emission luminance of the LED light source 21 by changing the duty ratio. It should be understood that, in this first embodiment, it is possible to change over the light emission luminance (the brightness) of the LED light source 21 in two stages, i.e. between a "high" mode and a "low" mode: in the "high" mode, as shown in FIG. 3(a), the duty ratio is in a 50% state, while in the "low" mode, as shown in FIG. 3(b), the duty ratio is in a 20% state. For example although, with the duty ratio at 50%, a large amount of light is obtained, since the amount of heat-generated is also great, accordingly the speed at which the temperature in the neighborhood of the light source 21 rises is fast. On the other hand, with the duty ratio at 20%, although the amount of light drops, since the heat generation and the heat dissipation are almost in balance, accordingly it is possible to emit light without the temperature in the neighborhood of the LED light source 21 rising. It should be understood that the duty ratio could be varied continuously.

The liquid crystal drive unit 25 generates a liquid crystal panel drive signal corresponding to the image data of the subject for projection that is transmitted from the CPU 103a, and displays an image of the subject for projection upon the liquid crystal panel 22 by driving the liquid crystal panel 22 with this generated drive signal. In concrete terms, voltages corresponding to the image signal are applied to each pixel in the liquid crystal layer. In this liquid crystal layer to which these voltages are applied, the state of the liquid crystal molecules changes, and the optical transmittivity of this liquid crystal panel 22 changes. Due to these changes of transmittivity, an image is displayed upon the liquid crystal panel 22.

The actuation unit 103 includes a CPU 103a that controls the device as a whole, a clock 103b that measures time, a power supply 103c for driving this portable telephone device with incorporated projector, a communication control unit 103d provided with an antenna 103e for communicating with a neighboring base station, an input device 103f provided with various types of button for the user to input telephone numbers or characters, a memory 103g for storing various types of data such as telephone directory data or the like, a memory card 103h for storing image data that has been photographed with the camera 102a, a TV tuner 103i for receiving TV broadcasts, a mike 103j for inputting voice utterances by the user, and an external interface 103k, that is an interface for connection to an external device.

When controlling the projector device 102b described above and projecting an image upon the screen, the CPU 103a, along with sending the image displayed by the user upon the liquid crystal monitor 102c to the liquid crystal drive unit 26 and displaying it upon the liquid crystal panel 22, also controls the LED drive unit 24 so as to irradiate light from the LED light source 21. Due to this, it is possible to display the image upon the screen in the same manner as with a normal projector. Furthermore, by performing digital processing upon the image data to be displayed, for example by performing LUT (Look Up Table) processing as described hereinafter, the CPU 103a is able to make the image brighter or darker, and moreover is able to perform contrast adjustment and/or color adjustment thereupon.

Now this LUT correction will be explained. In this embodiment, as described above, the light emission luminance of the LED light source 21 is varied by varying the duty ratio provided by the LED drive unit 24. If this duty ratio is decreased from 50% as when in the "high" mode to 0.20% as when in the "low" mode, and the luminance of the light that is irradiated from the LED light source 21 is thereby changed, then the luminance of the image that is projected upon the screen becomes darker. At this time, in order to compensate for the change of luminance of the image projected upon the screen, the CPU 103a performs LUT correction in advance upon the image data that is transmitted to the liquid crystal drive unit 25 and that is the subject for projection, and performs correction according to the change of luminance of the light that is irradiated from the LED light source 21, so that the image data becomes brighter. In concrete terms, it performs processing as explained below in order to compensate for the fact that the duty ratio has become 30% darker, from 50% to 20%.

In concrete terms, since during the "high" mode correction (compensation) of the luminance of the image is not required, either LUT correction is not performed, or, as shown in FIG. 4(a), LUT correction is performed by applying a linear LUT and taking the input value as the output value just as it is. By contrast, during the "low" mode, in order to compensate for the decrease of the luminance of the light irradiated from the LED light source 21, this linear LUT is changed based upon the luminance histogram of the image. For example, a luminance histogram of the image may be created, and, based upon this histogram, a decision may be made as to whether or not the number of distributed data in a range that corresponds to 30% from the high luminance side (the bright side) is greater than or equal to a predetermined value.

For example if, as shown in FIG. 4(b), the number of distributed data in the range that corresponds to 30% from the bright side in the histogram 41 is less than a predetermined value, then the slope of the linear LUT is changed as shown by the reference symbol 42, so as to compensate for a light reduction amount of 30%. Thereafter, correction is performed by applying this LUT to the image data of the subject for projection. Due to this, and taking into account the fact that the amount of data present in a range that corresponds to 30% from the bright side in a luminance histogram that is created according to image data is not generally very great, it is possible to perform correction in an appropriate manner so that only a few bright spots are introduced. In other words, the image data is corrected (compensated) with a linear coefficient.

By contrast if, as shown for example in FIG. 4(c), the number of distributed data in the range that corresponds to 30% from the bright side in the histogram 41 is greater than or equal to the predetermined value, then only intermediate adjustment increase is performed by multiplying the linear LUT by gamma, as shown by the reference symbol 44, in order to increase the overall luminance. And thereafter correction is performed by applying this LUT to the image data of the subject for projection. By doing this it is possible to increase the overall luminance while avoiding deterioration due to whiting out (white-clipping) on the bright side, thus compensating for a decrease in the luminance of the light that is irradiated from the LED light source 21. In other words, the image data is corrected with a non-linear coefficient, so as to moderate change in the direction of making the image data on the bright side yet more bright.

Figure 5:
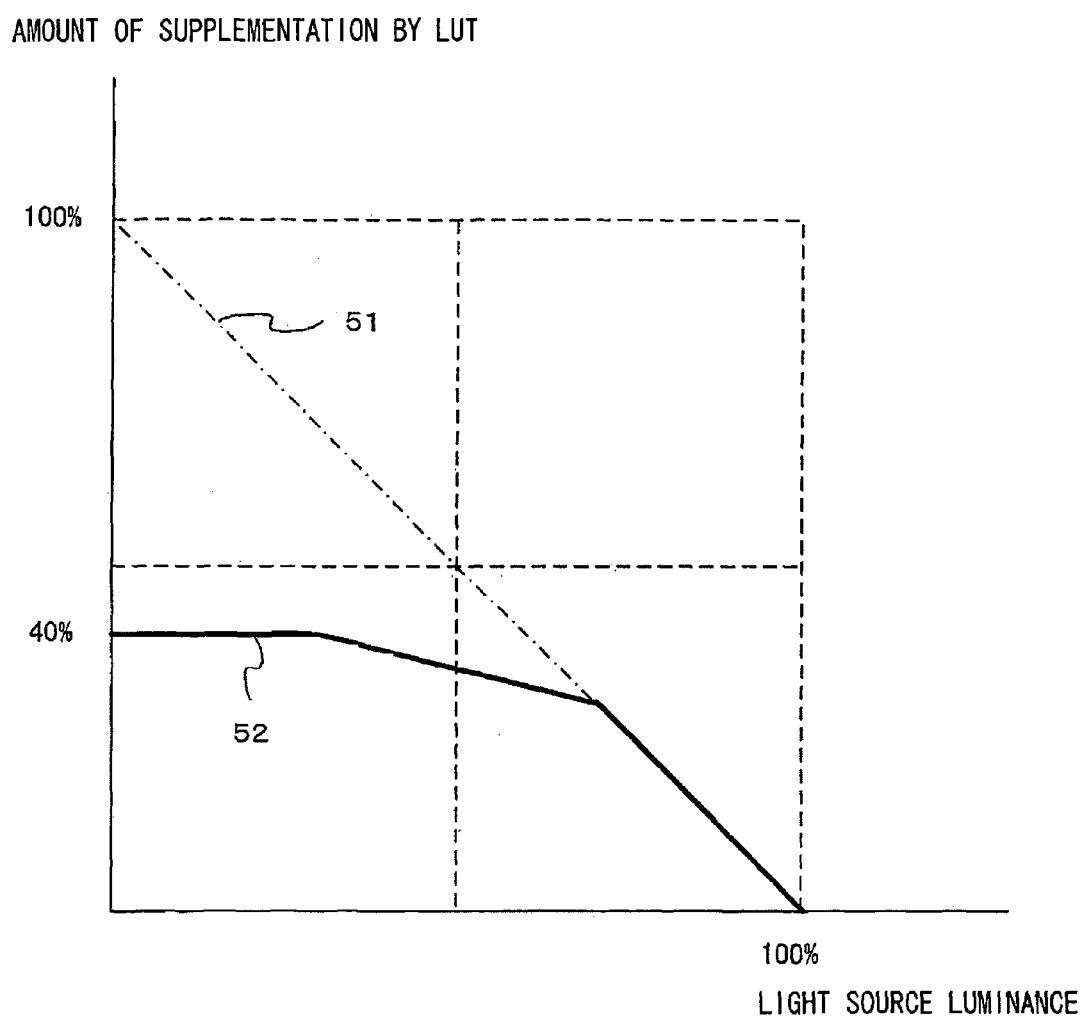
FIG. 5 is a figure showing a concrete example of a relationship between the luminance of a LED light source 21 and the amount of correction by LUT.

The relationship between the luminance of the LED light source 21 and the amount of supplementation by the LUT, according to the above, is as shown in FIG. 5. In other words if, when the luminance of the LED light source 21 has been changed, all of the image is simply supplemented according to the LUT without any consideration being paid to deterioration of the image, then the relationship between the luminance of the LED light source 21 and the amount of LUT supplementation becomes as shown by the single dotted broken line denoted by the reference symbol 51. In this case, if the luminance during the "high" mode is taken as being 100%, then the LUT shows linear and the amount of supplementation with the LUT becomes zero, while if the light source is supposed to reduce by n %, the amount of supplementation is related thereto as being n %.

However, as described above, if the LUT simply changes according to this relationship, then sometimes the image is damaged. Accordingly, in the region where the luminance of the light source is close to 100%, the LUT changes according to the above described relationship that is close to a straight line, and it is arranged for the amount of supplementation to be suppressed the more, the brighter the light source becomes. For example, as with the relationship shown by the reference symbol 52, an amount of supplementation of 40% may be taken as being a limit, and may be considered as saturation. Due to this, if the light irradiated from the LED light source 21 becomes only a little darker, then the luminance is maintained by the LUT correction; while, if the light becomes a great deal darker, then, although LUT correction is performed to some extent, damage to the image can be prevented by not performing correction as far as the original level of luminance.

Further, the CPU 103*a* acquires the time instant at which the LED light source 21 starts emitting light and the time instant at which this light emission ends from the clock 103*b*, and stores the history thereof in the memory 103*g*. By doing this, it becomes possible to ascertain the time periods over which the LED light source 21 has emitted light and the time periods over which it has not emitted light, in other words, its history of periods of being extinguished and being illuminated.

When projection of an image is to be performed by the projector device 102*b*, first the user selects the image that is to be the subject for projection and displays it upon the liquid crystal monitor 102*c*. As this image that is to be the subject for projection, any one of a still image or a moving image stored upon the memory card 103*h*, an image including characters such as a received email or the like, or an image of a TV broadcast received by the TV tuner 103*i*, may be selected and displayed upon the liquid crystal monitor 102*c* as the subject for projection. When the user issues a command for the start of projection of an image that is to be a subject for projection and that has been displayed upon the liquid crystal monitor 102*c*, then the CPU 103*a* starts projecting the image by controlling the projector device 102*b*, simultaneously with also terminating the display thereof upon the liquid crystal monitor 102*c*.

In this portable telephone device with incorporated projector 100 according to the first embodiment, as described above, a high luminance type white colored LED that can be driven with a large electrical current is used as the LED light source 21 of the projector device 102*b*. When a large electrical current flows in such a high luminance LED in this manner and it emits light, the amount of heat generated becomes greater than in the case of using a normal LED, and this heat can become a cause that gives rise to decrease of the luminance of the LED, or destruction thereof. Accordingly, it is necessary to suppress this heat which is generated from the LED light source 21, or to dissipate it in some appropriate manner. In order to do this, as described in (1)~(4) below, the CPU 103*a* changes the projection method for the image, according to the type of image that is the subject for projection, based upon various types of temperature information that will be described hereinafter.

(1) If the Type of the Image that is the Subject for Projection is "Still Image"

If the type of image that is the subject for projection is "still image", then the following kind of thermal countermeasure processing is performed, using as temperature information the temperature in the neighborhood of the LED light source 21, that is outputted from the temperature sensor 27. The CPU 103*a*, along with sending to the liquid crystal drive unit 26 image data for the still image that is to be the subject for projection and that is being displayed upon the liquid crystal panel 22, also controls the LED drive unit 24 so as to irradiate light from the LED light source 21 in the above described "high" mode.

Thereafter, the CPU monitors the temperature in the neighborhood of the installation position of the LED light source 21, based upon the output from the temperature sensor 27. And, when the temperature in the neighborhood of the installation position of the LED light source 21 reaches an upper limit temperature that is set in advance, the CPU controls the LED drive unit 24 and gradually lowers the duty ratio of the LED light source 21 down to the above described "low" mode. By doing this, it is possible to suppress the heat which is generated from the LED light source 21. It should be understood that this upper limit temperature is set to a temperature (for example 80° C.) that has been calculated by multiplying, by a fixed safety factor, the temperature for which, when the temperature in the neighborhood of the LED light source 21 rises to this temperature or greater, malfunctioning of the LED light source 21 or of its peripheral equipment takes place.

For example, as shown in FIG. 6(*a*), when the duty ratio is 50%, in other words when light is being irradiated from the LED light source 21 in the "high" mode, if the temperature in the neighborhood of the installation position of the LED light source 21 reaches the upper limit temperature that has been set in advance at the time instant T, then the duty ratio of the LED light source 21 is gradually decreased to 20%, in other words to the "low" mode, so that the elevation of the temperature in the neighborhood of the position of installation of the LED light source 21 is prevented. Furthermore, it is also possible to suppress the heat which is generated from the LED light source 21 by cycling the duty ratio of the LED light source 21 cyclically between the "high" mode and the "low" mode as shown in FIG. 6(*b*), or by lowering it stepwise from the "high" mode to the "low" mode as shown in FIG. 6(*c*).

Furthermore, as described above, simultaneously with the luminance of the LED light source 21 being changed, LUT correction is performed upon the image data that is sent to the liquid crystal drive unit 26, so that the luminance of the image is changed. In other words, if the light that is being irradiated from the LED light source 21 has become darker, the image is LUT processed according to the amount of this darkening so that it becomes brighter; while, if the light that is being irradiated from the LED light source 21 has become brighter, the image is LUT processed according to the amount of this darkening so that it becomes darker. Although there is a possibility that the user may experience a sense of discomfort, since the luminance of the image that is being projected upon the screen changes if the luminance of the light that is being irradiated from the LED light source 21 changes, it is possible to mitigate the change of luminance as seen by the human eye by changing the luminance of the image according to the amount of change of the luminance of the light that is irradiated from the LED light source 21 as described above.

(2) If the Type of the Image that is the Subject for Projection is "Image Including Characters, such as Received Email etc."

If the Type of the Image that is the Subject for projection is "image including characters, such as received email etc.", then, in the same manner as in the case (1) in which the type of the image that was the subject for projection was "still image", thermal countermeasure processing is performed using as temperature information the temperature in the neighborhood of the LED light source 21 that is outputted from the temperature sensor 27. In other words the CPU 103*a*, along with sending to the liquid crystal drive unit 26 image data for the screen displayed upon the liquid crystal monitor 102*c* in which the email that has been received by the user is shown, and displaying this image upon the liquid crystal panel 22, also performs the same processing as in the case (1).

(3) If the Type of the Image that is the Subject for Projection is "Moving Image"

If the Type of the Image that is the Subject for projection is "moving image", then, while taking into account the fact that the temperature in the neighborhood of the LED light source 21 is elevated by this moving image being continuously replayed, thermal countermeasure processing is performed by taking, as temperature information, the fact that the image that is the subject for projection is "moving image". In other words, the CPU 103a controls the LED drive unit 24 so as to set the luminance of the light that is irradiated from the LED light source 21 to the above described "low" mode. And, after having performed correction so that the data of the moving image that is the subject for projection is LUT corrected so that the image becomes brighter, the moving image data is sent to the liquid crystal drive unit 26 and is displayed upon the liquid crystal panel 22, so that thereby the moving image is projected. It should be understood that it is assumed that the luminance of the light that is irradiated from the LED light source 21 does not change during the projection of the moving image. Due to this, at the same time as preventing elevation of the temperature in the neighborhood of the LED light source 21 by suppressing the generation of heat from the LED light source 21, also it is possible to keep the luminance constant during this display of the moving image, thus making it possible to ensure that no sense of discomfort is experienced by the user.

(4) If the Type of the Image that is the Subject for Projection is "Broadcast TV Image"

If the type of the image that is the subject for projection is "TV broadcast image", then it is necessary to take elevation of the temperature in the neighborhood of the LED light source 21 into account by replaying the TV broadcast image continuously in the same manner as in case (3) above. Since, during a TV broadcast, commercials are inserted into the program, accordingly it is possible to take advantage of these time periods during commercials for the emission of heat. Thus, in this case, the CPU 103a detects the commercial portions of the TV broadcast that is received by the TV tuner 103i, and performs thermal countermeasure processing by taking these as temperature information. In other words, the CPU controls the LED drive unit 24 so as to set the luminance of the light irradiated from the LED light source 21 to the "low" mode, only during commercials.

As the method of detecting the commercial portions of the TV broadcast that is received, as with a conventional video recorder that is endowed with a function of cutting out commercials, stereo signals included in the TV broadcast are detected, and periods in which a stereo signal is detected are considered as being commercials. By setting the luminance of the light irradiated from the LED light source 21 to the "low" mode only during commercials in this manner, it is possible to suppress the generation of heat from the light source 21 by taking advantage of these time period bands in which, even if the image that is being projected is made darker, this will have little influence upon viewing by the user.

Figure 7:
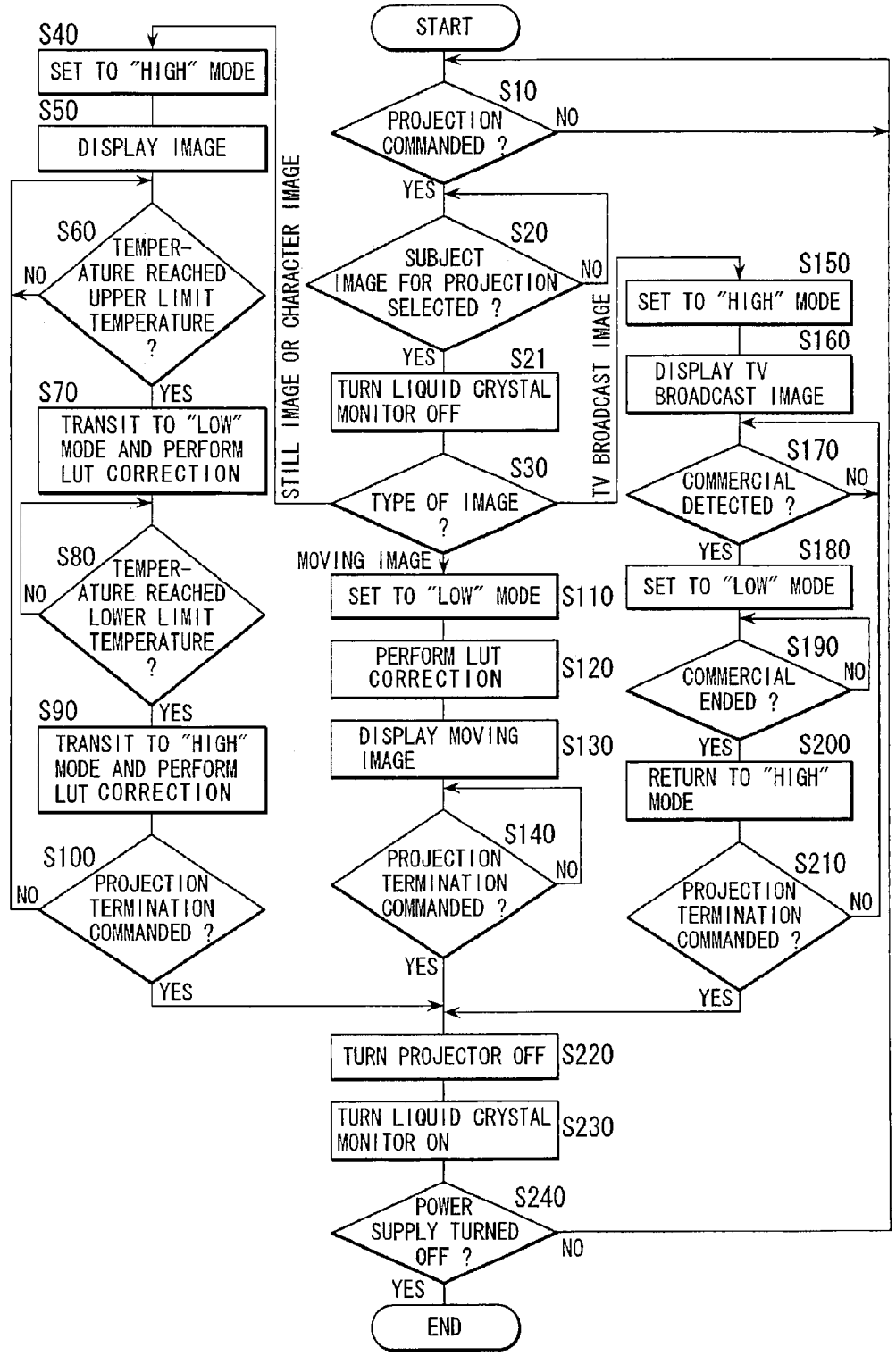
FIG. 7 is a flow chart showing processing performed by a portable telephone device with incorporated projector 100 according to the first embodiment.

FIG. 7 is a flow chart showing processing performed by this portable telephone device with incorporated projector 100 according to the first embodiment. This processing in FIG. 7 constitutes a program that is started when the power supply to this portable telephone device with incorporated projector 100 is turned ON, and that is executed by the CPU 103a. In a step S10, a decision is made as to whether or not the start of projection of an image has been commanded by the user. If it is decided that the start of projection of an image has been commanded by the user then the flow of control proceeds to a step S20, and a decision is made as to whether or not the image that is to be the subject for projection has been selected by the user. If it is decided that the image that is to be the subject for projection has been selected by the user, then the flow of control proceeds to a step S21, and a backlight of the liquid crystal monitor 102c is turned OFF, and also display of images upon the liquid crystal monitor 102c is turned OFF. Thereafter the flow of control proceeds to a step S30.

In the step S30, a decision is made as to the type of image that has been selected as the subject for projection. If it is decided that the type of the projection subject image is "still image" or "character image", then the flow of control proceeds to a step S40. In this step S40, the LED drive unit 24 is controlled as described above, and the light emission luminance of the LED light source 21 is set to "high" mode, and then the flow of control proceeds to a step S50. In this step S50, image data for the image that is the subject for projection is transmitted to the liquid crystal drive unit 25, and the image is projected upon the screen. At this time, LUT correction is not performed upon the image data that is transmitted. Thereafter the flow of control proceeds to a step S60, in which a decision is made, based upon the output from the temperature sensor 27, as to whether or not the temperature in the neighborhood of the position in which the LED light source 21 is installed has arrived at an upper limit temperature that has been set in advance. If it is decided that the temperature in the neighborhood of the installation position of the LED light source 21 has arrived at the upper limit temperature, then the flow of control proceeds to a step S70.

In this step S70, the LED drive unit 24 is controlled and the duty ratio of the LED light source 21 is gradually reduced to the "low" mode described above, and, along with this decrease of the duty ratio, LUT correction is performed upon the image data corresponding to the degree of this decrease. Thereafter the flow of control proceeds to a step S80, in which a decision is made, based upon the output from the temperature sensor 27, as to whether or not the temperature in the neighborhood of the installation position of the LED light source 21 has decreased as far as a lower limit temperature that has been set in advance. If it is decided that the temperature in the neighborhood of the installation position of the LED light source 21 has decreased as far as the lower limit temperature, then the flow of control proceeds to a step S90.

In this step S90, the LED drive unit 24 is controlled and the duty ratio of the LED-light source 21 is gradually increased to the "high" mode, and, along with this increase of the duty ratio, the LUT correction performed upon the image data is changed. And, at the time point that the system returns to the "high" mode, the LUT correction is stopped. Thereafter, the flow of control proceeds to a step S100. In this step S100, a decision is made as to whether or not termination of image projection has been commanded by the user, and if it is decided that termination has not been commanded, then the flow of control returns to the step S60. If, on the other hand, it is decided that termination has been commanded, then the flow of control is transferred to a step S220 that will be described hereinafter.

Next, the processing will be explained for the case that, in the step S30, it has been decided that the type of image that is to be the subject for projection is "moving image". In this case, the flow of control is transferred to a step S110. In this step S110, the LED drive unit 24 is controlled and the light emission luminance of the LED light source 21 is set to the "low" mode, and then the flow of control proceeds to a step S120. In this step S120, in order to mitigate the fact that the image that is being projected becomes darker due to the fact that the light emission luminance of the LED light source 21 has been set to the "low" mode, the above described LUT correction is performed upon the moving image data of the subject for projection, and then the flow of control proceeds to a step S130.

In this step S130, the moving image data of the subject for projection is transmitted to the liquid crystal drive unit 25 so as to project the moving image upon the screen, and then the flow of control proceeds to a step S140. In this step S140, a decision is made as to whether or not termination of image projection has been commanded by the user, and if it is decided that termination has been commanded, then the flow of control is transferred to the step S220 that will be described hereinafter.

If, in the step S30, it has been decided that the type of image that is to be the subject for projection is "TV broadcast image", then the flow of control is transferred to a step S150. In this step S150, the LED drive unit 24 is controlled and the light emission luminance of the LED light source 21 is set to the "high" mode, and then the flow of control proceeds to a step S160. In this step S160, the TV broadcast image data that has been received by the TV tuner 103i is transmitted to the liquid crystal drive unit 25 so as to project the TV broadcast image upon the screen. Thereafter the flow of control proceeds to a step S170, in which commercials are detected by detecting the stereo signal from the TV broadcast image data that is received. And if it has been decided that a commercial has been detected, then the flow of control proceeds to a step S180.

In this step S180, the LED drive unit 24 is controlled and the light emission luminance of the LED light source 21 is set to the "low" mode, and then the flow of control proceeds to a step S190. In this step S190, a decision is made as to whether or not the commercial has ended, in other words whether the detection of the commercial has ended or not. If it has been decided that the commercial has ended, then the flow of control proceeds to a step S200. In this step S200, the LED drive unit 24 is controlled and the light emission luminance of the LED light source 21 is returned to the "high" mode, and then the flow of control proceeds to a step S210. In this step S210, a decision is made as to whether or not termination of image projection has been commanded by the user, and if it is decided that termination has not been commanded, then the flow of control returns to the step S170. If, on the other hand, it is decided that termination has been commanded, then the flow of control is transferred to the step S220.

And, in this step S220, the LED drive unit 24 is controlled and the irradiation of light from the LED light source 21 is terminated, and the projector is turned OFF. Thereafter the flow of control proceeds to a step S230, in which a backlight of the liquid crystal monitor 102c is turned ON or the like and the display of the image upon the liquid crystal monitor 102c is turned ON, and then the flow of control proceeds to a step S240. In this step S240, a decision is made as to whether or not the power supply to this portable telephone device with incorporated projector 100 has been turned OFF by the user, and, if it is decided that the power supply has not been turned OFF, then the flow of control is returned to the step S10 and the processing described above is repeated. On the other hand, if it has been decided that the power supply to this portable telephone device with incorporated projector 100 has been turned OFF by the user, then processing is terminated.

According to the first embodiment as explained above, the following beneficial operational effects may be obtained.

(1) It was arranged to determine temperature information in the neighborhood of the LED light source 21, and to change the luminance of the light irradiated from the LED light source 21 based upon this temperature information that has been determined. By doing this, it is possible to determine the luminance of the light that is irradiated from the LED light source 21 while taking into account the temperature information in the neighborhood of the LED light source 21, so that it is possible to perform thermal countermeasures.

(2) If the type of the image that is to be the subject for projection is "still image" or "image including characters, such as received email or the like", then it is arranged, after starting projection in the "high" mode, when the temperature of the LED light source 21 reaches the predetermined value, to control the LED drive unit 24 so as gradually to lower the duty ratio of the LED light source 21 to the above described "low" mode. By doing this, it is possible to suppress the heat generated from the LED light source 21.

(3) If the type of the image that is to be the subject for projection is "moving image (movie)", then it is arranged to perform projection while setting the luminance of the light irradiated from the light source 21 to the "low" mode. And, after having performed LUT correction upon the data for the moving image that is the subject for projection so that the image becomes brighter, this moving image data is sent to the liquid crystal drive unit 26, so that the moving image is displayed upon the liquid crystal panel 22, and is projected. Since due to this it is possible, simultaneously with suppressing the heat which is generated from the LED light source 21, and simultaneously with enhancing the luminance of the moving image during display, also to keep the luminance constant, accordingly it is possible to ensure than no sense of discomfort is imparted to the user.

(4) If the type of the image that is to be the subject for projection is "TV broadcast image", then, after starting the projection in the "high" mode, when it has been detected that a commercial is present in the TV broadcast that is being received by the TV tuner 103i, it is arranged to change the luminance of the light that is being irradiated from the LED light source 21 to the "low" mode, only during this commercial. By doing this, it is possible to suppress the heat generated from the LED light source 21 by taking advantage of the commercial period, in which the influence upon the user is low even if the projected image becomes darker.

-Embodiment Two-

In a second embodiment, when the type of image that is to be the subject for projection is "still image" or is "image containing characters, such as a received email or the like", the luminance of the light that is irradiated from the LED light source 21 during image projection is controlled, not using the temperature of the LED light source 21 as detected by the temperature sensor 27, but rather using the temperature in the neighborhood of the LED light source 21 as estimated based upon the light emission history of the LED light source 21, this history being stored in the memory 103g. Furthermore, when the type of image that is to be the subject for projection is "TV broadcast image", during a commercial, the LED light source 21 is extinguished so as to turn OFF the projector, and instead the image is displayed upon the liquid crystal monitor 102c, so that thereby the temperature in the neighborhood of the LED light source 21 is decreased.

It should be understood that a figure showing the external appearance of this portable telephone device with incorporated projector, and a block diagram thereof, are here omitted, since they would be the same as FIG. 1 and FIG. 2 that have been explained in relation to the first embodiment. Furthermore, since the processing for the case in which the type of image that is to be the subject for projection is "moving image", and the case in which it is "TV broadcast image", are the same as the processing in the case of the first embodiment, explanation thereof will here be curtailed.

The CPU 103a estimates the temperature in the neighborhood of the LED light source 21 based upon the light emission history of the LED light source 21 that has been stored in the memory 103g, and drive controls the LED drive unit 24 based upon the result thereof. It should be understood that the LED drive unit 24 controls the light emission luminance of the LED light source 21 to any one of three states: the above described "high" mode, the above described "low" mode, and a state of being turned out.

First, at the time point that the LED light source 21 starts emission of light, the CPU 103a reads in the light emission history for the directly preceding five minutes, and, if the LED light source 21 did not emit light during this time, in other words if the LED light source 21 has been extinguished continuously for greater than or equal to five minutes, then the CPU estimates that the temperature in the neighborhood of the LED light source 21 is at an initial temperature that is set in advance, for example 30° C. This is done in consideration of the fact that generally, if the LED light source 21 has been extinguished continuously for greater than or equal to five minutes, the temperature in the neighborhood of the LED light source 21 will have become the same as an initial temperature that is equal to the temperature around it, due to natural air cooling. On the other hand, if the LED light source 21 has emitted light during the directly preceding five minutes, then a current estimated temperature is calculated by a method that will be described hereinafter.

Thereafter, it is decided whether the LED light source 21 is emitting light in either the "high" mode or the "low" mode, and, based upon its light emitting state, the current temperature in the neighborhood of the LED light source 21 is estimated. In other words, while in the "high" mode it is lit up more brightly, to this extent, the heat generation is also greater. By contrast, while in the "low" mode it is darker, since the heat generation is smaller, accordingly it is almost compatible with the capacity for heat dissipation. Furthermore, when the LED light source is turned off, it is subject to natural air cooling. In order to estimate the current temperature in the neighborhood of the LED light source 21 in consideration of the characteristics of temperature change in each of the modes in this manner, the amount of change of the temperature in each of the modes may be, for example, defined as follows.

(1) The Amount of Change of the Temperature During the "High" Mode

During the "high" mode, the temperature in the neighborhood of the LED light source 21 increases at the rate of 2° C. per second.

(2) The Amount of Change of the Temperature During the "Low" Mode

During the low mode, the temperature in the neighborhood of the LED light source 21 does not change.

(3) The Amount of Change of the Temperature when Turned Off

When the LED light source 21 is turned off, the temperature in its neighborhood decreases at the rate of 1° C. per second.

The amounts of change of the temperature in the neighborhood of the LED light source 21 in these various modes are determined based upon experimental values that are measured in advance, and are stored in the memory 103g. Using these rates of change of temperature with time in the various modes, the CPU 103a estimates the current temperature in the neighborhood of the LED light source 21 according to the following Equation (1).

$$\text{Estimated temperature} = \text{initial temperature} + \Sigma((\text{time illuminated in each mode}) \times (\text{rate of change of temperature with time in each mode})) \quad (1)$$

However if, due to the LED light source being continuously extinguished, the estimated temperature calculated according to Equation (1) is less than the initial temperature, then the estimated temperature is corrected to being the initial temperature. This is because the temperature does not drop indefinitely, even if natural air cooling continues; rather, the temperature stabilizes at the initial temperature that is compatible with the surrounding temperature.

And, at the time point that the current estimated temperature as calculated by Equation (1) arrives at an upper limit temperature that is set in advance, the CPU 103a changes the mode by controlling the LED drive unit 24, so as to suppress the elevation of temperature. It should be understood that, in the same manner as in the case of the first embodiment, this upper limit temperature is set to a temperature, for example 80° C., that has been calculated by multiplying, by a fixed safety factor, the temperature for which, when the temperature in the neighborhood of the LED light source 21 rises to this temperature or greater, malfunctioning of the LED light source 21 or of its peripheral equipment takes place.

For example in the situation that the light emission history of the LED light source 21 up until the present moment, that is determined based upon its light emission history stored in the memory 103g, is as shown in FIG. 8(a), i.e. in the situation that the LED light source was in the "high" mode for 20 seconds from the start of light emission and then was turned out for ten seconds, and if the initial temperature is 30° C., then the current estimated temperature is calculated according to the following Equation (2).

$$\text{Estimated temperature} = 30° \text{C.} + (2° \text{C./second} \times 20 \text{ seconds}) + ((-1)° \text{C./second} \times 10 \text{ seconds}) = 60° \text{C.} \quad (2)$$

In other words, the estimated temperature in the neighborhood of the LED light source 21 changes from the start of light emission until the present moment as shown in FIG. 8(b), and the current estimated temperature becomes 60° C. If in this state, as shown in FIG. 8(a), light emission is again started from the present moment in the "high" mode, it is possible to estimate that after ten seconds the upper limit temperature of 80° C. will be reached. And, after this ten seconds has actually elapsed from the present moment, when the estimated temperature in the neighborhood of the LED light source 21 has arrived at 80° C., the LED drive unit 24 is controlled so as to transition to the "low" mode, in order to prevent the temperature from rising further. And, simultaneously with this transition to the "low" mode, LUT correction is performed in order to maintain the luminance of the image that is being projected, in the same manner as in the case of the first embodiment. At this time, in order simultaneously to notify the user to the effect that the system has transitioned to the "low" mode, along with turning ON the display to the liquid crystal monitor 102c and displaying a warning message, also a warning sound is outputted via the speaker 102e.

By doing this, it is possible to continue projection of the image that is the subject for projection while maintaining the temperature so that it does not exceed the upper limit value of 80° C. By compensating for the decrease in the luminance of the LED light source 21 with LUT correction, it is possible to reduce the change of luminance of the image that is being projected, thus ensuring that no sense of discomfort is imparted to the user. If thereafter, as shown in FIG. 8(a), after the "low" mode has been continued for 15 seconds, a command is issued by the user to turn off the LED light source 21, in other words if the termination of projection is commanded, then as shown in FIG. 8(b) the temperature in the neighborhood of the LED light source 21 decreases steadily towards its initial temperature of 30° C. at the rate of 1° C. per second.

Figure 9:
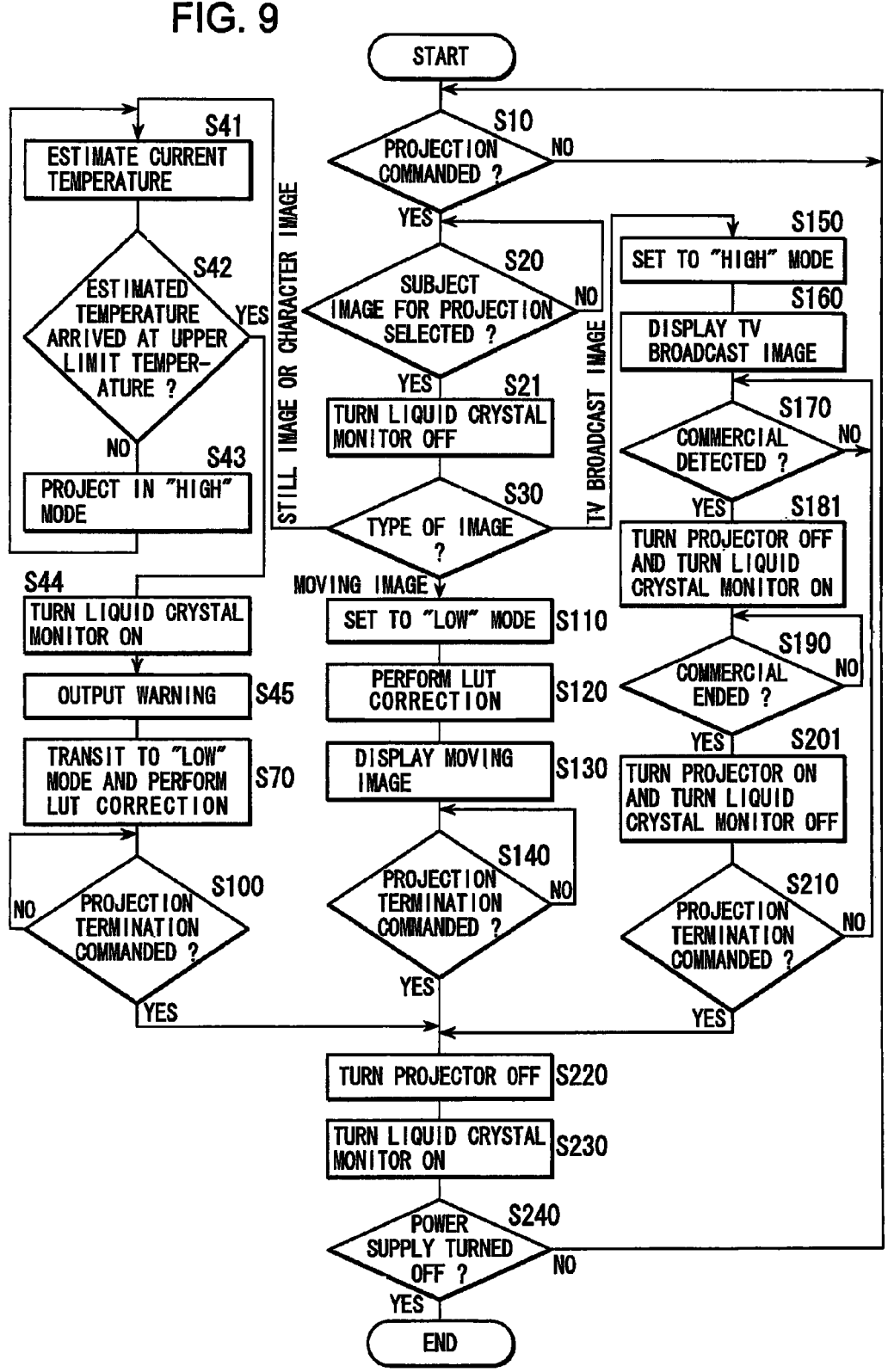
FIG. 9 is a flow chart showing processing performed by a portable telephone device with incorporated projector 100 according to the second embodiment.

FIG. 9 is a flow chart showing processing performed by the portable telephone device with incorporated projector 100 according to the second embodiment. This processing in FIG. 9 constitutes a program that is started when the power supply to this portable telephone device with incorporated projector 100 is turned ON, and that is executed by the CPU 103a. It should be understood that, to steps for which the processing details are the same as in the processing for the first embodiment shown in FIG. 7, the same step numbers are affixed, and explanation thereof is omitted; only the points of difference will be explained. In a step S41, based upon the light emission history of the LED light source 21 that is stored in the memory 103g, the current temperature in the neighborhood of the LED light source 21 is estimated. Then the flow of control proceeds to a step S42.

In this step S42, a decision is made as to whether or not this estimated current temperature in the neighborhood of the LED light source 21 has arrived at an upper limit temperature that has been set in advance. If it is decided that the estimated current temperature in the neighborhood of the LED light source 21 has not arrived at the upper limit temperature set in advance, then the flow of control proceeds to a step S43, and the LED drive unit 24 is controlled so as to irradiate light from the LED light source 21 in the "high" mode, so as to project the image that is the subject for projection; and then the flow of control returns to the step S41. On the other hand, if it is decided that the estimated current temperature in the neighborhood of the LED light source 21 has arrived at the upper limit temperature set in advance, then the flow of control proceeds to a step S44, and the display on the liquid crystal monitor 102c is turned ON and the flow of control proceeds to a step S45.

In this step S45, in order to notify the user to the effect that the system has transitioned to the "low" mode, along with displaying a warning message upon the liquid crystal monitor 102c, also a warning sound is outputted via the speaker 102e. Thereafter the flow of control proceeds to the step S70 and the LED drive unit 24 is controlled so that the duty ratio of the LED light source 21 gradually is reduced towards the "low" mode described above, and, along with this decrease in the duty ratio, LUT correction is performed upon the image data to an extent corresponding to the degree of this decrease.

Furthermore, if in the step S170 a commercial has been detected, then the flow of control is transferred to a step S181. In this step S181, the LED drive unit 24 is controlled to extinguish the LED light source 21 so that the projector is turned OFF, and instead the backlight of the liquid crystal monitor 102c is turned ON and the image is displayed upon the liquid crystal monitor 102c, and then the flow of control proceeds to the step S190. In the step S190, if the end of the commercial has been detected, the flow of control is transferred to a step S191, and the LED drive unit 24 is controlled to return the LED light source 21 to the "high" mode so that the projector is turned ON, and the backlight of the liquid crystal monitor 102c is turned OFF and the display of the image upon the liquid crystal monitor 102c is terminated.

According to the second embodiment as explained above, in addition to the beneficial operational effects obtained by the first embodiment, the following further beneficial effects may be obtained.

(1) When the type of the image that is to be the subject for projection is "still image" or "image including characters, such as received email or the like", then the current temperature in the neighborhood of the LED light source 21 is estimated based upon the light emission history for the LED light source 21 that is stored in the memory 103g, and the luminance of the light irradiated from the LED light source 21 is controlled so that the neighborhood of the LED light source 21 does not exceed the upper limit value that has been set in advance. Due to this, it is possible to monitor the temperature in the neighborhood of the LED light source 21, and to perform thermal countermeasures, even without providing any measurement device such as a temperature sensor or the like.

(2) When the type of the image that is to be the subject for projection is "TV broadcast image", if a commercial has been detected, it is arranged to turn out the LED light source 21 and to turn the projector OFF, and instead to display the image upon the liquid crystal monitor 102c. Furthermore, if the end of the commercial has been detected, then it is arranged to return the LED light source 21 to the "high" mode and to turn the projector ON, and to terminate the display of the image upon the liquid crystal monitor 102. By doing this, it is possible to dissipate the heat in the neighborhood of the LED light source 21 by taking advantage of the period of the commercial, in which little influence is exerted upon the user even if the destination upon which the image is displayed is switched over to the liquid crystal monitor 102c.

-Variant Embodiments-

It should be understood that the portable telephones according to the embodiments described above may also be varied in the following ways.

(1) Although, in the first and second embodiments described above, the portable telephone device with incorporated projector 100 having the structure shown in FIG. 2 was explained, this should not be considered as being limitative; it would also be possible to apply the present invention to any type of portable telephone to which a sub-liquid crystal, a GPS antenna, or an infrared ray communication unit or the like is additionally mounted.

(2) In the explanation of the first and second embodiments described above, by way of example, the still image or the moving image projected by the projector 102b was supposed to be a still image or a moving image that had been photographed by the camera 102a. However this should not be taken as being limitative; for example, it would also be acceptable for this image, for example, to be a still image or a moving image that has been read in from an external device via the external interface 103k, or via an infrared ray communication unit or the like not shown in the figures.

(3) In the first and second embodiments described above, by way of example, it was explained that, when the luminance of the light irradiated from the LED light source 21 was changed over to the "low" mode, LUT correction was performed at the same time upon the data of the image that was the subject for projection, thus mitigating the decrease of luminance of the projected image. However, it would also be acceptable to arrange for it to be possible for the user to select whether or not to perform this simultaneous LUT correction, and, when the luminance of the light irradiated from the LED light source 21 changes over to the "low" mode, to perform LUT correction at the same time upon the data of the image that is the subject for projection, only if the setting for performing this simultaneous LUT correction has been established by the user.

(4) In the first and second embodiments described above it was explained, by way of example, that a luminance histogram of the image that is the subject for projection is created;

that, based upon this histogram, it is decided whether or not the number of distributed data in the range that corresponds to 30% from the high side of luminance is greater than or equal to a predetermined value; and that the image data is LUT corrected based upon the result of this decision. However, this should not be taken as being limitative; it would also be acceptable to arrange to perform LUT correction by some other algorithm. For example, in the case of a luminance histogram of the image that is the subject for projection as shown in FIG. 10(a), in other words if the image that is the subject for projection is an image in which there are a lot of medium tones, then the LUT correction may be performed by applying a LUT as shown in FIG. 10(b), so as to multiply the range of these medium tones by y. Furthermore if, as shown in FIG. 10(c), the histogram of the image that is the subject for projection is biased towards the black side, then it would also be acceptable to arrange to perform the LUT correction by applying a LUT as shown in FIG. 10(d), so as to raise the contrast on the black side. According to this, it is possible to change the LUT based upon the distribution of the data in the image that is the subject for projection.

(5) In the first and second embodiments described above, when the type of the image that was the subject for projection was "still image" or "image including characters, such as received email or the like", then, when the temperature in the neighborhood of the LED light source 21 arrived at its upper limit value, it was arranged to prevent further elevation of this temperature in the neighborhood of the LED light source 21 by darkening the luminance of the light irradiated from the LED light source 21 (i.e. by establishing the "low" mode). However, this should not be considered as being limitative; it would also be acceptable to arrange, when the temperature in the neighborhood of the LED light source 21 has arrived at its upper limit value, to turn out the LED light source 21 and thus stop projecting the image that is the subject for projection, and to display the image that is the subject for projection upon the liquid crystal monitor 102c.

(6) In the first and second embodiments described above, it was arranged for it to be possible to change over the light emission luminance of the LED light source 21 by changing over the LED drive unit 24 between the "high" mode and the "low" mode. However, this should not be considered as being limitative; it would also be acceptable to arrange for it to be possible to change over the LED drive unit 24 through a larger number of mode steps, such as three steps or more.

(7) In the first and second embodiments described above, examples were explained of executing various types of processing by a portable telephone device with incorporated projector, in which a projector device 102b that projects an image is mounted to a portable telephone. However, this should not be considered as being limitative; it would also be possible to apply the present invention to a portable information terminal with incorporated projector such as a PDA or the like to which a projector device is mounted, or to a conventional projector device just as it stands.

(8) Although, in the first and second embodiments described above, the example was explained of using white color LEDs as the light source for the projector device 102b, this should not be considered as being limitative; for example, it would also be acceptable to arrange to use some other light source, such as a halogen lamp or an organic EL or the like.

-Embodiment Three-

In a third embodiment, it is arranged to fade in and to fade out the image by changing the luminance of the light that is irradiated from the LED light source 21 during image projection. It should be understood that a figure showing the external appearance of this portable telephone device with incorporated projector, and a block diagram thereof, are here omitted, since they would be the same as FIG. 1 and FIG. 2 that have been explained in relation to the first embodiment.

As previously described, the LED drive unit 24 controls the drive electrical power of the LED light source 21 by PWM drive, and is able to vary the light emission luminance of the LED light source 21 by varying the duty ratio. For example, to compare the case, as shown in FIG. 3(a) for the first embodiment, in which the duty ratio is set to 50%, with the case of the duty ratio being set to 20% as shown in FIG. 3(b), in the case where the duty ratio is set to 50%, the light that is irradiated from the LED light source 21 becomes brighter.

In this embodiment, the state in which the above described duty ratio is 50% is defined as being the "bright state", while the state in which the above described duty ratio is 20% is defined as being the "dark state". And the LED drive unit 24 is able to vary the duty ratio continuously, so that it is possible for the luminance of the LED light source 21 to be continuously changed from the "bright state" to the "dark state". Since due to this the luminance of the object varies, accordingly it is sufficient-simply to vary the duty ratio, and processing for applying luminance modulation to the image data becomes unnecessary, so that it is possible to reduce the load upon the CPU 103a.

The liquid crystal drive unit 25 generates a liquid crystal panel drive signal according to the data for the image that is to be the subject for replay, transmitted from the CPU 103a, and displays the image that is the subject for replay upon the liquid crystal panel 22 by driving the liquid crystal panel 22 with this generated drive signal. In concrete terms, it applies a voltage according to the image signal to each pixel in the liquid crystal layer. The state of the liquid crystal molecules in the liquid crystal layer to which voltage has been applied changes, so that the transmittivity to light of the liquid crystal panel changes. Due to this change of transmittivity, the image is displayed upon the liquid crystal panel 22.

In this embodiment, it is possible to select whether the image will be displayed upon the liquid crystal monitor 101c, or whether the projector device 102b will be controlled to project the image upon the screen; and, if a command has been issued by the user to control the projector device 102b and to project the image upon the screen, then the CPU 103a, along with sending the image that has been selected by the user to the liquid crystal drive unit 26 and displaying it upon the liquid crystal panel 22, also controls the LED drive unit 24 so as to irradiate light from the LED light source 21. At this time, the CPU 103a c controls the LED drive unit 24 as described below, so as to fade in and fade out the image that is projected upon the screen, thus imparting a beneficial visual sensation.

(1) When Fading in the Image

When fading in the image, the CPU 103a controls the LED drive unit 24 so as to set the luminance of the LED light source 21 to the above described "dark state" when starting display of the image, and thereafter controls it so as to change the luminance gradually towards the "bright state". In other words, when starting to display the image, the CPU 103a controls the LED drive unit 24 and thereby sets the above described duty ratio to 20%, and thereafter increases the duty ratio at a constant rate until it reaches 50%. Since, by doing this, the image that is projected upon the screen at the start of display is dark, and thereafter the image is gradually displayed brighter and brighter, accordingly it is possible to impart the beneficial visual sensation of fading it in.

(2) When Fading Out the Image

When fading out the image, the CPU 103a controls the LED drive unit 24 so as to set the luminance of the LED light source 21 to the above described "bright state" when starting display of the image, and thereafter controls it so as to change the luminance gradually towards the "dark state". In other words, when starting to display the image, the CPU 103a controls the LED drive unit 24 and thereby sets the above described duty ratio to 50%, and thereafter decreases the duty ratio at a constant rate until it reaches 20%. Since, by doing this, the image that is projected upon the screen at the start of display is bright, and thereafter the image is gradually displayed darker and darker, accordingly it is possible to impart the beneficial visual sensation of fading it out.

It is possible to set in advance whether or not fading in and fading out of the image during projection will be performed, and, for fading in and fading out of one image, it is possible to select from among "perform both", "perform only one or the other", and "do not perform either". Furthermore, it is also possible to execute a slide show by displaying a plurality of images successively at predetermined time intervals, and, while a slide show is being performed, it is also possible to perform projection while fading in and/or fading out each image.

Figure 11:
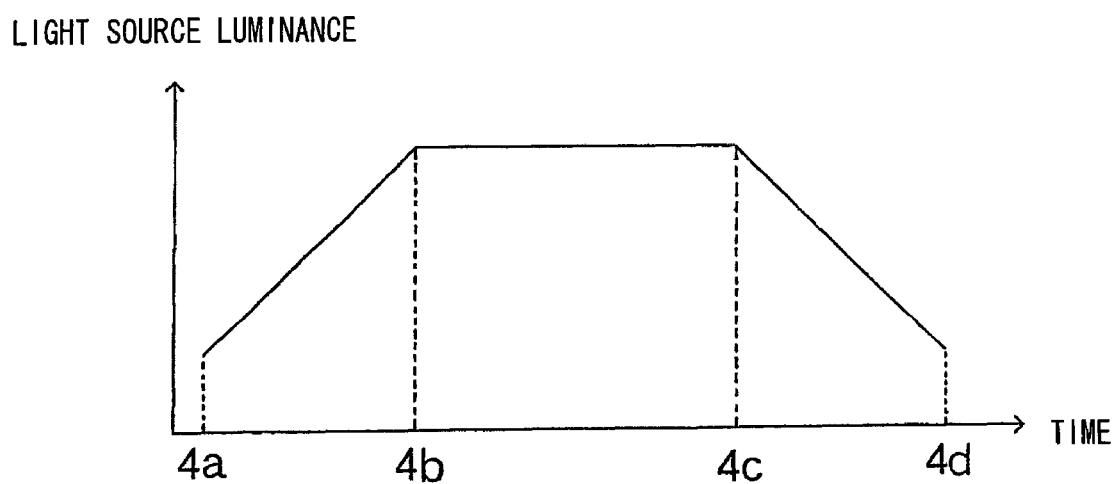
FIG. 11 is a figure showing the change over time of the luminance of the LED light source 21, when fade in and fade out are both performed for a single image.

FIG. 11 is a figure showing the change over time of the luminance of the LED light source 21, when fade in and fade out are both performed for a single image. As shown in FIG. 11, at the starting time point 4a of image projection, the luminance of the LED light source 21 is set to the "dark state", and thereafter is gradually brightened at a constant rate, so that it is set to the "bright state" at the time point 4b. Thereafter, after the "bright state" has been maintained for a predetermined time period that is set in advance, the LED light source is darkened at a constant rate from the time point 4c, and when it reaches the "dark state" at the time point 4d, at the same time the projection of the image is terminated.

Figure 12:
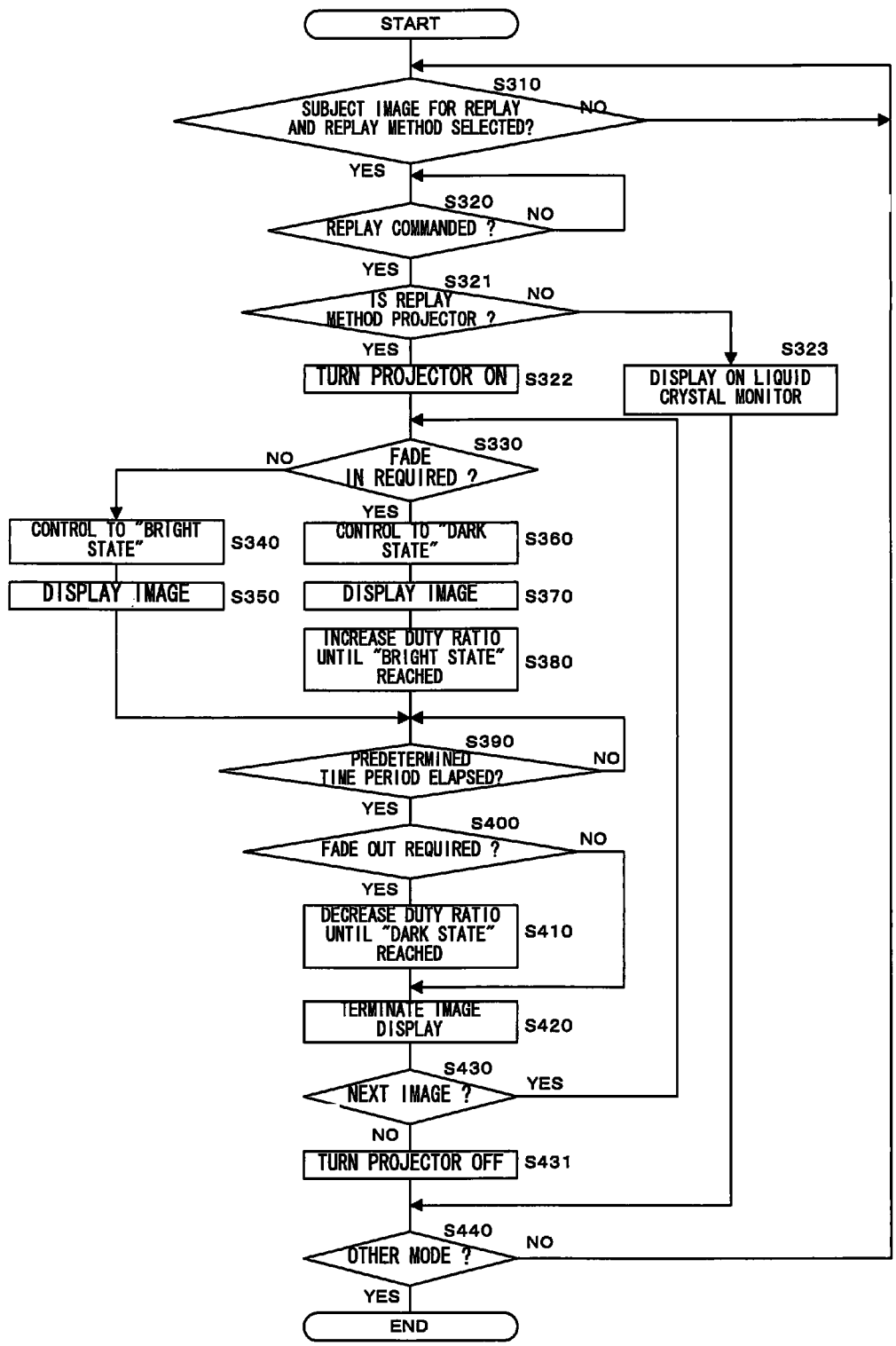
FIG. 12 is a flow chart showing processing performed by the portable telephone device with incorporated projector 100 according to this embodiment.

FIG. 12 is a flow chart showing processing performed by the portable telephone device with incorporated projector 100 according to this embodiment. This processing in FIG. 12 constitutes a program that is started when the power supply to this portable telephone device with incorporated projector 100 is turned ON, and that is executed by the CPU 103a. In a step S310, a decision is made as to whether or not the image that is to be the subject of replay has been selected by the user, and as to whether or not a replay method for either projecting it with the projector device 102b or displaying it upon the liquid crystal monitor 102c has been selected. If it is decided that the selection of the image that is to be the subject of replay, and also the selection of the replay method, have been performed, then the flow of control proceeds to a step S320. In this step S320, a decision is made as to whether or not replay of the image that has been selected by the user has been commanded by the user or not, and if it is decided that replay has been commanded, then the flow of control proceeds to a step S321.

In this step S321, it is decided whether or not the replay method that has been selected by the user is projection with the projector device 102b. If it is decided that the replay method that has been selected by the user is not projection with the projector device 102b, then the flow of control proceeds to a step S323, and the image that is to be the subject for replay is displayed upon the liquid crystal monitor 102c, and then the flow of control is transferred to a step S440 that will be described hereinafter. On the other hand, if it is decided that the replay method that has been selected by the user is projection with the projector device 102b, then the flow of control proceeds to a step S322. In this step S322, the LED drive unit 24 is controlled so as to irradiate light from the LED light source 21, and the projector is automatically turned ON. Thereafter, the flow of control proceeds to a step S330.

In this step S330, a decision is made as to whether or not fade in is required, in other words as to whether or not it has been set in advance by the user to perform fading in. If it is decided that it has not been set in advance by the user to perform fading in, then the flow of control proceeds to a step S340. In this step S340, the LED drive unit 24 is controlled so as to set the luminance of the LED light source 21 to the "bright state", and then the flow of control proceeds to a step S350. In this step S350, the data for the image that is the subject for replay is transmitted to the liquid crystal drive unit 25, so as to display this image upon the screen. And thereafter, the flow of control is transferred to a step S390 that will be described hereinafter.

On the other hand, if it is decided that it has been set by the user to perform fading in, then the flow of control proceeds to a step S360. In this step S340, the LED drive unit 24 is controlled so as to set the luminance of the LED light source 21 to the "dark state". Thereafter, the flow of control proceeds to a step S370, and the data for the image that is the subject for replay is transmitted to the liquid crystal drive unit 25, so as to display this image upon the screen, and then the flow of control proceeds to a step S380. In this step S380, the LED drive unit 24 is controlled so as to increase the duty ratio of the luminance of the LED light source 21 at a constant rate, until this luminance reaches the "bright state", and then the flow of control proceeds to the step S390.

In this step S390, a decision is made as to whether or not the time period over which projection has been performed in the "bright state" has reached a predetermined time period that has been determined in advance. If it is decided that the time period over which projection has been performed in the "bright state" has reached the predetermined time period, then the flow of control proceeds to a step S400. In this step S400, a decision is made as to whether or not fade out is required, in other words as to whether or not a command has been issued by the user to perform fading out. If it is decided that it has not been set in advance by the user to perform fading out, then the flow of control proceeds to a step S420 that will be described hereinafter.

On the other hand, if it is decided that it has been set by the user to perform fading out, then the flow of control proceeds to a step S410. In this step S410, the LED drive unit 24 is controlled so as to decrease the luminance of the LED light source 21 at a constant rate, until this luminance reaches the "dark state", and then the flow of control proceeds to the step S420. In this step S420, the transmission of the image data for the subject for replay to the liquid crystal drive unit 25 is stopped, and the projection of the image is terminated. Thereafter, the flow of control proceeds to a step S430. In this step S430, if a plurality of images have been selected by the user as images that are to be the subjects for replay, a decision is made as to whether or not a subsequent image that is to be a subject for replay is present. If it has been decided that a subsequent image that is to be a subject for replay is present, then the flow of control returns to the step S330, and the above described processing is performed for the subsequent image.

On the other hand, if it has been decided that no subsequent image that is to be a subject for replay is present, then the flow of control proceeds to a step S431. In this step S431, the LED drive unit 24 is controlled so as to stop the irradiation of light from the LED light source 21, so that the projector is automatically turned OFF. Thereafter, the flow of control proceeds to the step S440. In this step S440, a decision is made as to whether or not the mode of this portable telephone device with incorporated projector 100 has been changed by the user to some mode other than image replay, and if it is decided that such a change has not been made, then the flow of control returns to the step S310 and the processing described above is repeated. On the other hand, if it is decided that the mode of this portable telephone device with incorporated projector 100 has been changed by the user to some mode other than image replay, then processing terminates.

According to this embodiment as explained above, the following beneficial operational effects may be obtained.

(1) It is arranged to fade in and fade out the image by varying the luminance of the light irradiated from the LED light source 21 during image projection. Due to this, it is not necessary to perform any special image processing for fading in and fading out of the image, and accordingly it is possible to reduce the load upon the CPU.

(2) It is arranged to drive the LED light source 21 by PWM drive, and for the LED drive unit 24 to change the light emission luminance of the LED light source 21 by continuously varying the duty ratio thereof. Due to this, it is possible to vary the luminance of the image continuously during fading in and fading out, so that no sense of discomfort is imparted to a viewer, and it is possible to give a beneficial visual sensation.

(3) It is arranged to be able to select whether or not to perform fading in and fading out during projection of an image, from among "perform both" fading in and fading out, "perform one or the other, only", and "perform neither". Due to this, it is possible to perform projection of the image while imparting a beneficial visual sensation according to the desires of the user.

(4) It is arranged to make it possible to display a plurality of images successively at predetermined time intervals, and to be able to perform this projection while fading in and/or fading out each of these images. Due to this, it is also possible to perform projection while executing a slide show, and moreover it is possible to impart the beneficial visual sensation of fading in and/or fading out each of the images during this execution of the slide show.

(5) When replay of an image has been commanded by the user, it is arranged to control the LED drive unit 24 so as to irradiate light from the LED light source 21, thus automatically turning the projector ON. Due to this, there is no requirement for the user to turn the projector ON separately, so that the convenience is enhanced.

(6) When the replay of an image has been terminated, it is arranged to control the LED drive unit 24 so as to stop irradiating light from the LED light source 21, thus automatically turning the projector OFF. Due to this, there is no requirement for the user to turn the projector OFF separately, so that the convenience is enhanced.

(7) It is arranged to suppress the amount of light that is irradiated from the LED light source 21 in order to perform fading in and fading out during projection of an image. Due to this, it is possible to suppress the amount of battery consumption of this portable telephone device with incorporated projector 100, and to lengthen the time period over which it may be continuously used.

-Variant Embodiments-

It should be understood that the portable telephones according to the embodiments described above may also be varied in the following ways.

(1) Although, in the embodiments described above, portable telephone devices with incorporated projector 100 having the structure shown in FIG. 2 were explained, this should not be considered as being limitative; it would also be possible to apply the present invention to any type of portable telephone to which a sub-liquid crystal, a GPS antenna, or an infrared ray communication unit or the like is additionally mounted.

(2) In the embodiments described above it was explained, by way of example, that the LED drive unit 24 controlled the drive electrical power of the LED light source 21 by PWM drive. However, this should not be considered as being limitative; it would also be possible to arrange for the LED drive unit 24 to control the drive electrical power of the LED light source 21 by some other method.

(3) In the embodiments described above, examples were explained of executing various types of processing by a portable telephone device with incorporated projector, in which a projector device 102*b* that projects an image is mounted to a portable telephone. However, this should not be considered as being limitative; it would also be possible to apply the present invention to a portable information terminal with incorporated projector such as a PDA or the like to which a projector device is mounted, or to a conventional projector device just as it stands.

(4) Although, in the embodiments described above, the example was explained of using white color LEDs as the light source for the projector device 102*b*, this should not be considered as being limitative; for example, it would also be acceptable to arrange to use some other light source, such as, for example, an organic EL or the like.

Figure 13:
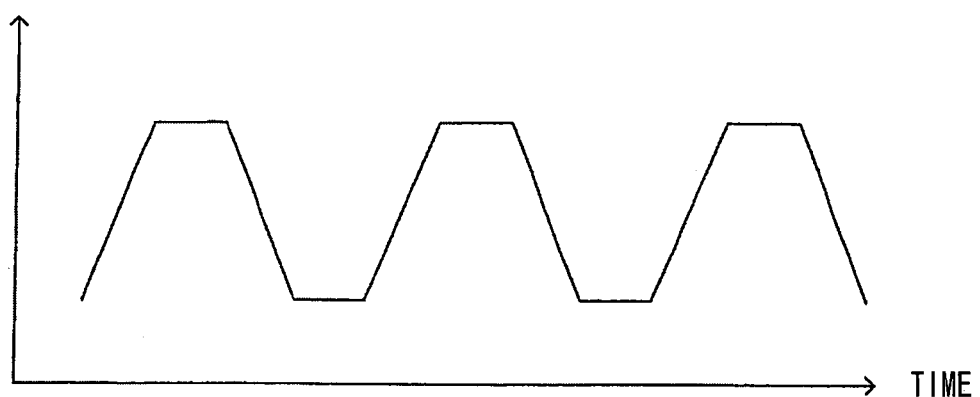
FIG. 13 is a figure showing the change over time of the luminance of the LED light source 21, in a variant embodiment.

(5) In the embodiments described above, it was arranged to vary the luminance of the LED light source 21 as shown in FIG. 11, and thereby to fade in and to fade out the image that is the subject of replay. However, this should not be considered as being limitative; it would also be possible to change the luminance of the LED light source 21, for example, as shown in FIG. 13. In other words, while displaying a single image, it would be acceptable to arrange to change the luminance of the image cyclically between the "bright state" and the "dark state" in an alternating manner.

(6) Although, in the embodiments described above, it was explained by way of example that the duty ratio in the "dark state" was set to the 20% state, it might also be some other ratio; or it would also be acceptable to arrange for a state in which the LED light source 21 is completely extinguished to be taken as being the "dark state".

-Embodiment Four-

In the first embodiment, an example was explained in which it was decided whether to set the luminance of the light irradiated from the LED light source 21 during image projection to the "high" mode, or to set it to the "low" mode, according to the type of image that was the subject of projection. However, in a fourth embodiment, an example will be explained in which, once the light emission luminance of the LED light source 21 is set to the "low" mode (also sometimes termed the "normal mode"), it is set to the "high mode" (also sometimes termed the "bright mode") according to actuation by the user. When the user issues a command for the "high" mode, thermal countermeasures are performed that are the same as in the first embodiment. It should be understood that a figure showing the external appearance of this portable telephone device with incorporated projector, and a block diagram thereof, are here omitted, since they would be the same as FIG. 1 and FIG. 2 that have been explained in relation to the first embodiment.

Figure 14:
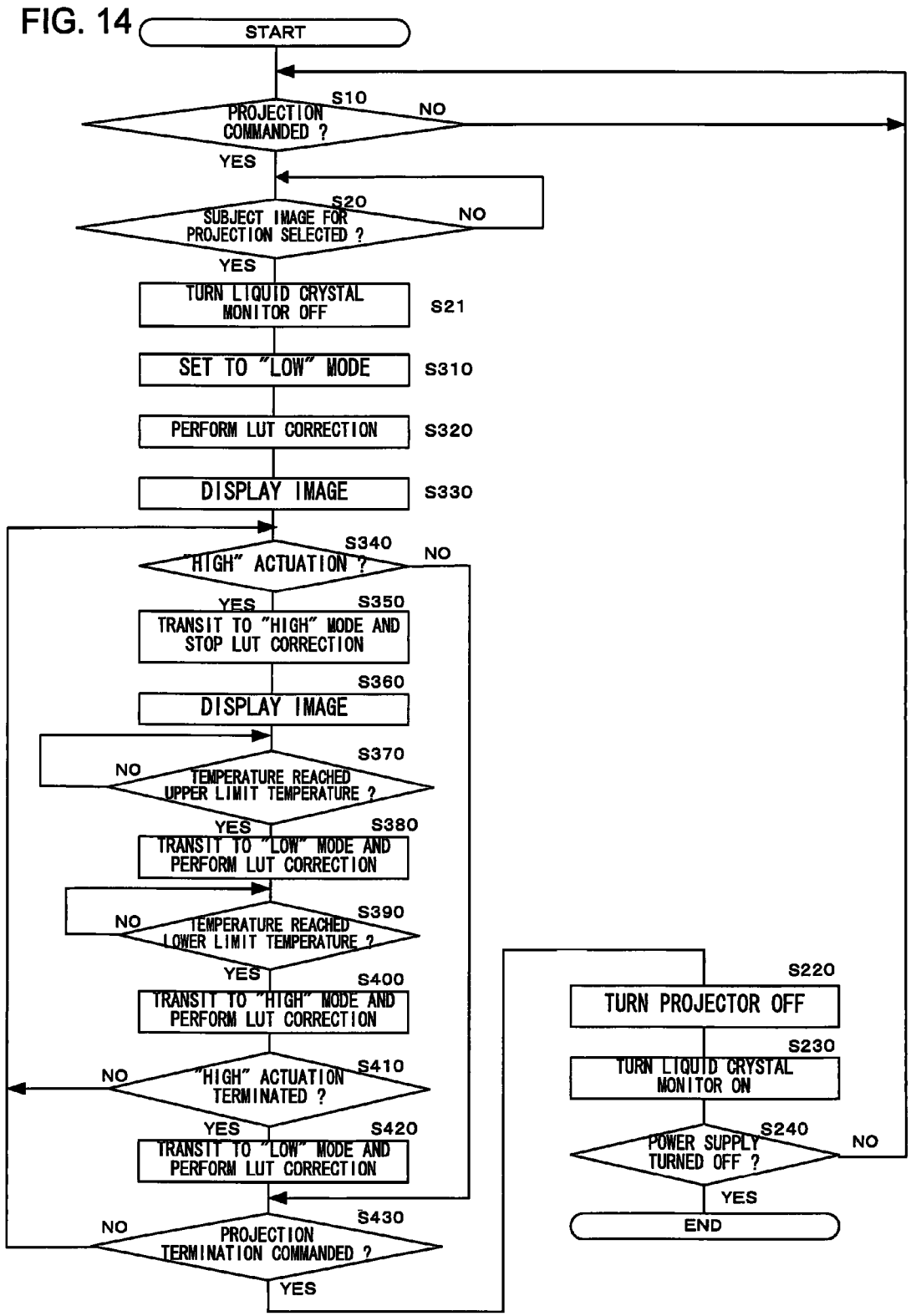
FIG. 14 is a flow chart showing processing performed by a portable telephone device with incorporated projector 100 according to a fourth embodiment.

FIG. 14 is a flow chart showing processing performed by a portable telephone device with incorporated projector 100 according to this fourth embodiment. This processing shown in FIG. 14 constitutes a program that is started when the power supply to this portable telephone device with incorporated projector 100 is turned ON, and that is executed by the CPU 103*a*. It should be understood that, to steps for which the processing details are the same as in the processing for the first embodiment shown in FIG. 7, the same step numbers are affixed.

In a step S10, a decision is made as to whether or not a command has been issued by the user for the start of projection of an image. If it has been decided that a command has been issued by the user for the start of projection of an image, then the flow of control proceeds to a step S20, and a decision is made as to whether or not an image has been selected by the user as a subject for projection. If it is decided that an image has been selected by the user as a subject for projection, then the flow of control proceeds to a step S21, and a backlight of the liquid crystal monitor 102c is turned OFF or the like, so that the display of the image upon the liquid crystal monitor 102c is turned OFF. Then control is transferred to a step S310.

In this step S310, the LED drive unit 24 is controlled and the light emission luminance of the LED light source 21 is temporarily set to the "low" mode, and then the flow of control proceeds to a step S320. In this step S320, in order to mitigate the fact that the image that is being projected has become darker due to the light emission luminance of the LED light source 21 having been put down to the "low" mode, the above described LUT correction is performed upon the moving image data that is the subject for projection, and then the flow of control proceeds to a step S330.

In this step S330, the data for the image that is the subject for projection is transmitted to the liquid crystal drive unit 25, so that the image is projected upon the screen. Thereafter the flow of control proceeds to a step S340, in which a decision is made as to whether or not the user has actuated a "high" mode button (i.e. a "bright" mode button) Any one of the buttons upon the input device 103f may be allocated as this "high" mode button. The "high" mode is commanded while the user presses the "high" mode button continuously, and, when he releases the "high" mode button, the system returns to the "low" mode. If, in this step S340, it is decided that the user is actuating (pressing) the "high" mode button, then the flow of control proceeds to a step S350; while, if it is decided that he is not performing such actuation, then the flow of control is transferred to a step S430.

In the step S350, the LED drive unit 24 is controlled and the duty ratio of the LED light source 21 is gradually raised to the "high" mode, and, along with this elevation of the duty ratio, the LUT correction upon the image data is changed. And, at the time point that the system has returned to the "high" mode, the LUT correction is stopped. Thereafter, the flow of control proceeds to a step S360. In this step S360, the data for the image that is to be the subject for projection is transmitted to the liquid crystal drive unit 25, and the image is projected upon the screen. Thereafter, the flow of control proceeds to a step S370, and a decision is made, based upon the output from a temperature sensor 27, as to whether or not the temperature in the neighborhood of the installation position of the LED light source 21 has reached an upper limit temperature that is set in advance. If it is decided that the temperature in the neighborhood of the installation position of the LED light source 21 has reached the upper limit temperature, then the flow of control proceeds to a step S380.

In this step S380, the LED drive unit 24 is controlled and the duty ratio of the LED light source 21 is gradually reduced to the above described "low" mode, and, along with this decrease of the duty ratio, LUT correction is performed upon the image data according to the degree of this decrease. Thereafter, the flow of control proceeds to a step S390, and a decision is made, based upon the output from a temperature sensor 27, as to whether or not the temperature in the neighborhood of the installation position of the LED light source 21 has decreased as far as a lower limit temperature that is set in advance. If it is decided that the temperature in the neighborhood of the installation position of the LED light source 21 has decreased as far as the lower limit temperature, then the flow of control proceeds to a step S400.

In this step S400, the LED drive unit 24 is controlled and the duty ratio of the LED light source 21 is gradually increased to the above described "high" mode, and, along with this increase of the duty ratio, the LUT correction performed upon the image data is changed. And, at the time point that the system has returned to the "high" mode, the LUT correction is stopped. Thereafter, the flow of control proceeds to a step S410.

In the step S410, a decision is made as to whether or not the user is not actuating the "high" mode button. In other words, it is decided whether or not the user has released the "high" mode button, thus stopping his commanding of the "high" mode. If it is decided that the user has stopped commanding the "high" mode, then the flow of control proceeds to a step S420; while, if it is decided that he is not thus stopping commanding, then the flow of control returns to the step S340 and the above processing is repeated.

In the step S420, the LED drive unit 24 is controlled and the duty ratio of the LED light source 21 is gradually reduced to the "low" mode, and, along with this reduction of the duty ratio, LUT correction is performed upon the image data according to the degree of this decrease. Thereafter, the flow of control proceeds to a step S430.

In this step S430, a decision is made as to whether or not termination of projection of the image has been commanded by the user, and, if it is decided that termination has not thus been commanded, then the flow of control returns to the step S340. By contrast, if it is decided that termination has been commanded, then the flow of control proceeds to a step S220.

In this step S220, the LED drive unit 24 is controlled to end the irradiation of light from the LED light source 21, so that the projector is turned OFF. Thereafter, flow of control proceeds to a step S230, and the backlight of the liquid crystal monitor 102c is turned ON so that the image is displayed upon the liquid crystal monitor 102c, and then the flow of control proceeds to a step S240. In this step S240, a decision is made as to whether or not the power supply to this portable telephone device with incorporated projector 100 has been turned OFF by the user, and, if it is decided that the power supply has not been turned OFF, then the flow of control is returned to the step S10 and the processing described above is repeated. On the other hand, if it has been decided that the power supply to this portable telephone device with incorporated projector 100 has been turned OFF by the user, then processing is terminated.

According to the fourth embodiment as explained above, the following beneficial operational effects may be obtained.

(1) It is arranged normally to set the light emission luminance of the LED light source 21 to the "low" mode (also termed the "normal" mode), while it is set to the "high" mode (also termed the "bright" mode) according to actuation by the user. Due to this, normally, elevation of the temperature of the LED light source 21 is not induced, and it becomes possible to light it up continuously, while still ensuring its fundamental luminance. And it becomes possible to perform display at high luminance and high contrast, according to the needs of the user. This implies that it is possible to implement the needs, in the case of a handy projector, for it to be possible to perform projection at high luminance, even for a short time period.

(2) When the system transits to the "high" mode, in the same manner as in the case of the first embodiment, it is arranged to make a decision as to the temperature information in the neighborhood of the LED light source 21, and, to change the luminance of the light irradiated from the LED light source 21, based upon this temperature information that has thus been decided. Due to this, it is possible to determine the luminance of the light irradiated from the LED light source 21 while taking into account the temperature information in the neighborhood of the LED light source 21, and it is possible to perform thermal countermeasures. And it is possible reliably to prevent problems due to temperature elevation, even if the user presses the "high" mode button for a long period of time.

It should be understood that it would also be acceptable, in the first, second, and fourth embodiments described above, to arrange, when the system transits from the "high" mode to the "low" mode, and also when the system transits from the "low" mode to the "high" mode, to perform this transition while imparting a beneficial visual sensation such as fading in and fading out the image, as in the case of the third embodiment. By doing this, no sense of discomfort is imparted to the viewer, and it becomes possible to suppress heat generation by the light source, and also to suppress the consumption of electrical power.

Figure 15:
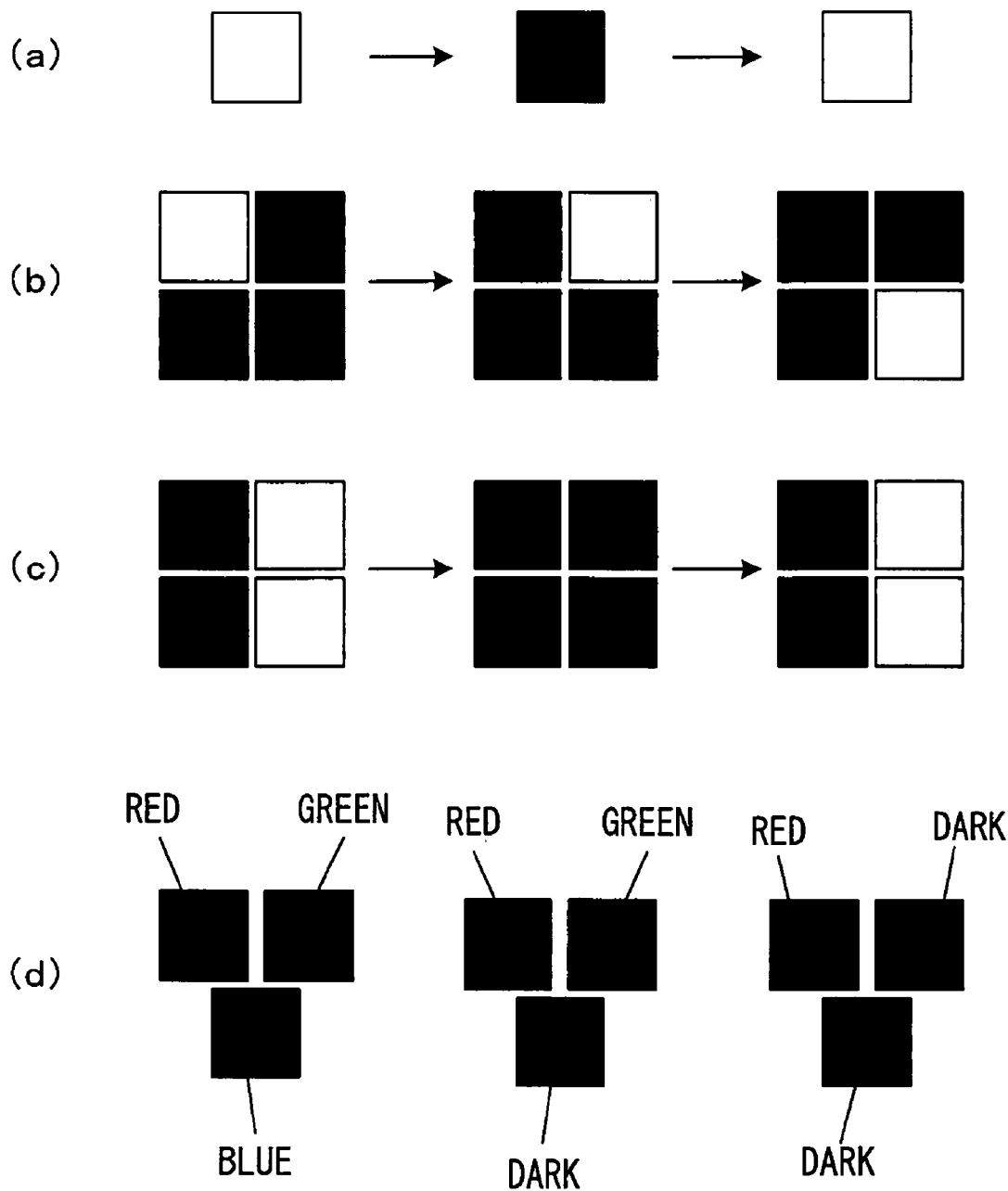
FIG. 15 is a figure showing certain variant embodiments of methods for providing a beneficial visual sensation.

In the third embodiment described above an example was explained in which the luminance of the light irradiated from the LED light source 21 was changed in order to obtain the beneficial visual sensation of fading in and fading out the image. However, it would also be acceptable to implement a different beneficial visual sensation from fading in and fading out the image, by changing the luminance of the light irradiated from the LED light source 21 as shown in FIG. 15. FIG. 15 is a figure showing variant embodiments for providing a beneficial visual sensation.

FIG. 15(a) shows an example in which the LED is blinked, and its period is changed. It would also be acceptable to arranged to change this period in correlation with outputting music from the portable telephone. And FIG. 15(b) shows an example in which the spots at which a plurality of LEDs are lit up are changed around and around. Moreover, FIG. 15(c) shows an example in which the spots at which a plurality of LEDs are lit up are gradually changed. Finally, FIG. 15(d) shows an example in which the combination in which red, blue, and green LEDs are lit up is changed. By doing this, it is possible to change the white balance by only darkening a specified color. Furthermore, it also becomes possible to change the color while blinking the display.

Although the details of various embodiments have been explained in the above description, the present invention is not to be considered as being limited by the contents thereof. Other modes that are considered to lie within the range of the technical concept of the present invention are also included within its scope.

The contents of the disclosures of the following applications upon which priority is claimed are hereby incorporated by reference:
Japanese Patent Application 2004-341522 (filed on November 26, 2004);
Japanese Patent Application 2004-341523 (filed on Nov. 26, 2004).

The invention claimed is:

1. A projector device, comprising:
   an image generation unit that generates an image;
   an irradiation unit that irradiates light for projecting the image generated by the image generation unit upon a projection surface;
   a change unit that changes luminance of the light irradiated from the irradiation unit to a first luminance and a second luminance, a light amount of the second luminance being greater than a light amount of the first luminance and a heat generation amount of the irradiation unit with the second luminance being greater than a heat generation amount of the irradiation unit with the first luminance; and
   a temperature information determination unit that determines temperature information in a neighborhood of the irradiation unit;
   an image type decision unit that decides as to a type of the image generated by the image generation unit, wherein:
   the change unit firstly changes the luminance of the light irradiated from the irradiation unit to the first luminance and then changes the luminance of the light irradiated from the irradiation unit to the second luminance when the temperature information determination unit has determined that the temperature information in the neighborhood of the irradiation unit designates a temperature higher than a predetermined value, in case the image type decision unit decides that the type of the image generated by the image generation unit is a still image; and
   the change unit changes the luminance of the light irradiated from the irradiation unit to the second luminance from the beginning irrespective of the temperature information determined by the temperature information determination unit, in case the image type decision unit decides that the type of the image generated by the image generation unit is a moving image.

2. A projector device according to claim 1, wherein the temperature information determination unit comprises:
   a history storage unit that stores a history of light irradiation from the irradiation unit;
   an estimating unit that estimates the temperature in the neighborhood of the irradiation unit, based upon the history stored in the history storage unit; and
   a comparison unit that decides upon the temperature information by comparing the temperature estimated by the estimating unit with the predetermined value.

3. A projector device according to claim 1, further comprising:
   a monitor that displays the image, wherein the image is displayed upon the monitor, when the luminance of the light irradiated from the irradiation unit has been changed by the change unit.

4. A projector device according to claim 1, further comprising:
   a warning unit that outputs a warning to the user, when the luminance of the light irradiated from the irradiation unit has been changed by the change unit.

5. A projector device according to claim 1, further comprising:
   a correction unit that corrects luminance of the image generated by the image generation unit.

6. A projector device according to claim 5, further comprising:
   a control unit that performs control by combining change by the change unit of the luminance of the light irradiated from the irradiation unit, and correction by the correction unit of the luminance of the image generated by the image generation unit, wherein the control unit changes a control method between the still image and the moving image.

7. A projector device according to claim 1, wherein
   when the change unit performs change of the luminance of the irradiated light, the image generation unit changes the luminance of the image in a direction opposite to the change of luminance of the irradiated light.

8. A projector device comprising:

an image generation unit that generates an image;

an irradiation unit that irradiates light for projecting the image generated by the image generation unit upon a projection surface; and a change unit that changes luminance of the light irradiated from the irradiation unit, wherein when the change unit changes the irradiated light to lower, the image generation unit changes the luminance of the image to make it brighter by a linear coefficient to correct decrease of the irradiated light when a number of distributed data at a bright side of the image is less than a predetermined value, and changes the luminance of the image to make it brighter by a non-linear coefficient suppressing the bright side of the image when the number of distributed data at the bright side of the image is greater than or equal to the predetermined value.

9. A projector device according to claim 1, wherein the control unit controls the drive unit not to turn off the light source even in case that the luminance of the light irradiated from the light source is the darkest.

* * * * *